(12) United States Patent
Takahashi

(10) Patent No.: US 11,174,187 B2
(45) Date of Patent: Nov. 16, 2021

(54) GLASS CONTAINER AND ONE-PRESS METHOD FOR PRODUCING GLASS CONTAINER

(71) Applicant: KOA GLASS CO., LTD, Tokyo (JP)

(72) Inventor: Masahiro Takahashi, Ichikawa (JP)

(73) Assignee: KOA Glass Co., LTD, Tokyo (JP)

(*) Notice: Subject to any disclaimer, the term of this patent is extended or adjusted under 35 U.S.C. 154(b) by 584 days.

(21) Appl. No.: 15/419,639

(22) Filed: Jan. 30, 2017

(65) Prior Publication Data

US 2018/0215643 A1 Aug. 2, 2018

(51) Int. Cl.

| C03B 11/05 | (2006.01) |
|---|---|
| C03B 11/10 | (2006.01) |
| C03B 11/12 | (2006.01) |
| B65D 1/00 | (2006.01) |
| B65D 23/00 | (2006.01) |
| B65D 25/04 | (2006.01) |

(52) U.S. Cl.
CPC .............. *C03B 11/05* (2013.01); *C03B 11/10* (2013.01); *C03B 11/127* (2013.01)

(58) Field of Classification Search
CPC ......... C03B 11/10; C03B 11/127; B65D 1/04; B65D 25/04; B65D 2501/24
USPC .............. 206/581, 823; 220/500–557; 215/6; 428/34.1, 34.4
See application file for complete search history.

(56) References Cited

U.S. PATENT DOCUMENTS

| 2,065,504 A * | 12/1936 | Beck ..................... C03B 9/1932 |
| | | 65/79 |
| 2,215,942 A * | 9/1940 | Terrell .................... B43L 25/00 |
| | | 215/6 |
| 3,052,368 A * | 9/1962 | Atkins ..................... A47J 47/02 |
| | | 215/6 |
| 3,261,494 A * | 7/1966 | Walker, Jr. .......... A47G 19/2205 |
| | | 220/555 |
| 5,332,112 A * | 7/1994 | Blocker ................. A47G 19/12 |
| | | 215/230 |
| 5,921,440 A * | 7/1999 | Maines .............. B65D 81/3288 |
| | | 215/6 |
| 2005/0234422 A1* | 10/2005 | Oh .......................... B65D 25/08 |
| | | 604/415 |
| 2006/0021986 A1* | 2/2006 | Mansfield .......... A47G 19/2205 |
| | | 220/506 |
| 2009/0127263 A1* | 5/2009 | Hylton .................... A47G 19/23 |
| | | 220/507 |
| 2011/0036867 A1* | 2/2011 | Flores ................. B05B 11/0078 |
| | | 222/144.5 |

(Continued)

FOREIGN PATENT DOCUMENTS

| JP | A2000-211930 | 8/2000 |
| JP | A2011-019649 | 2/2011 |

OTHER PUBLICATIONS

"Planar." Merriam-Webster, Merriam-Webster, www.merriam-webster.com/dictionary/planar.; "Merriam-Webster" (Year: 2021).*

*Primary Examiner* — Lee E Sanderson
*Assistant Examiner* — Michael C Romanowski
(74) *Attorney, Agent, or Firm* — Renner, Kenner; Arthur M. Reginelli

(57) ABSTRACT

The present invention relates to a glass container having multiple concavities at the bottom plane of a mouth provided with a rim, and a one-press method for producing a glass container, by which such a glass container can be produced with high yield.

11 Claims, 30 Drawing Sheets

(56) References Cited

U.S. PATENT DOCUMENTS

2016/0083280 A1\* 3/2016 Sato .................. B65D 1/02
                                                                                                428/34.4
2017/0013980 A1\* 1/2017 Pickett ............... B65D 21/0209

\* cited by examiner

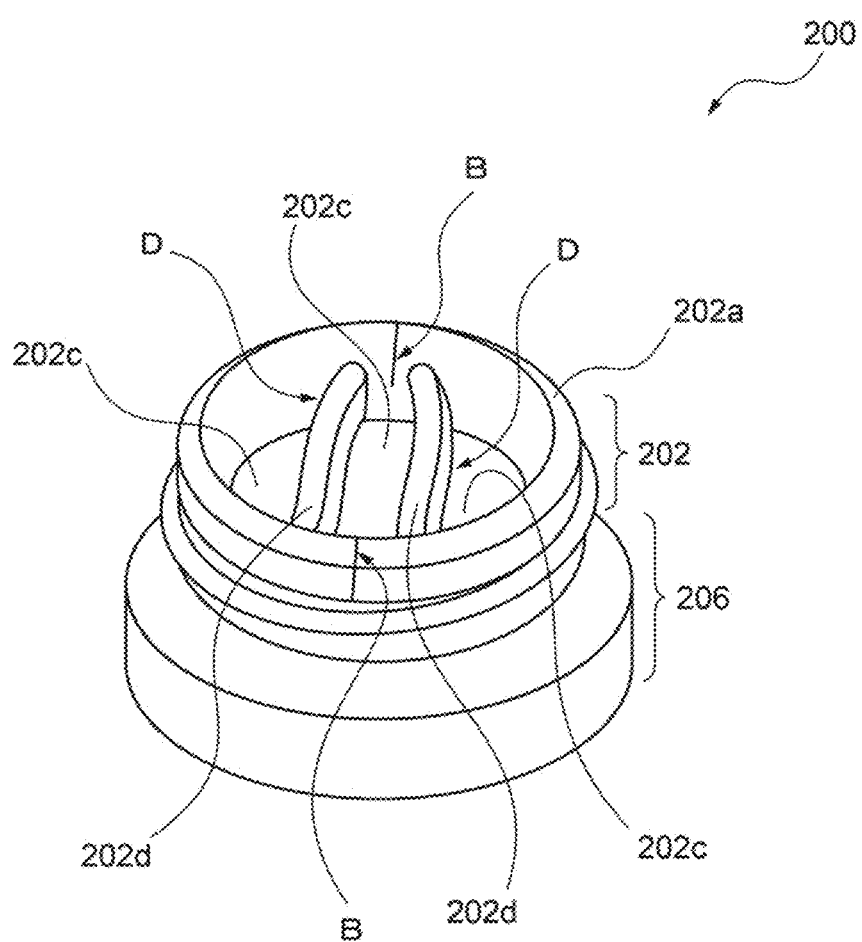

(a)

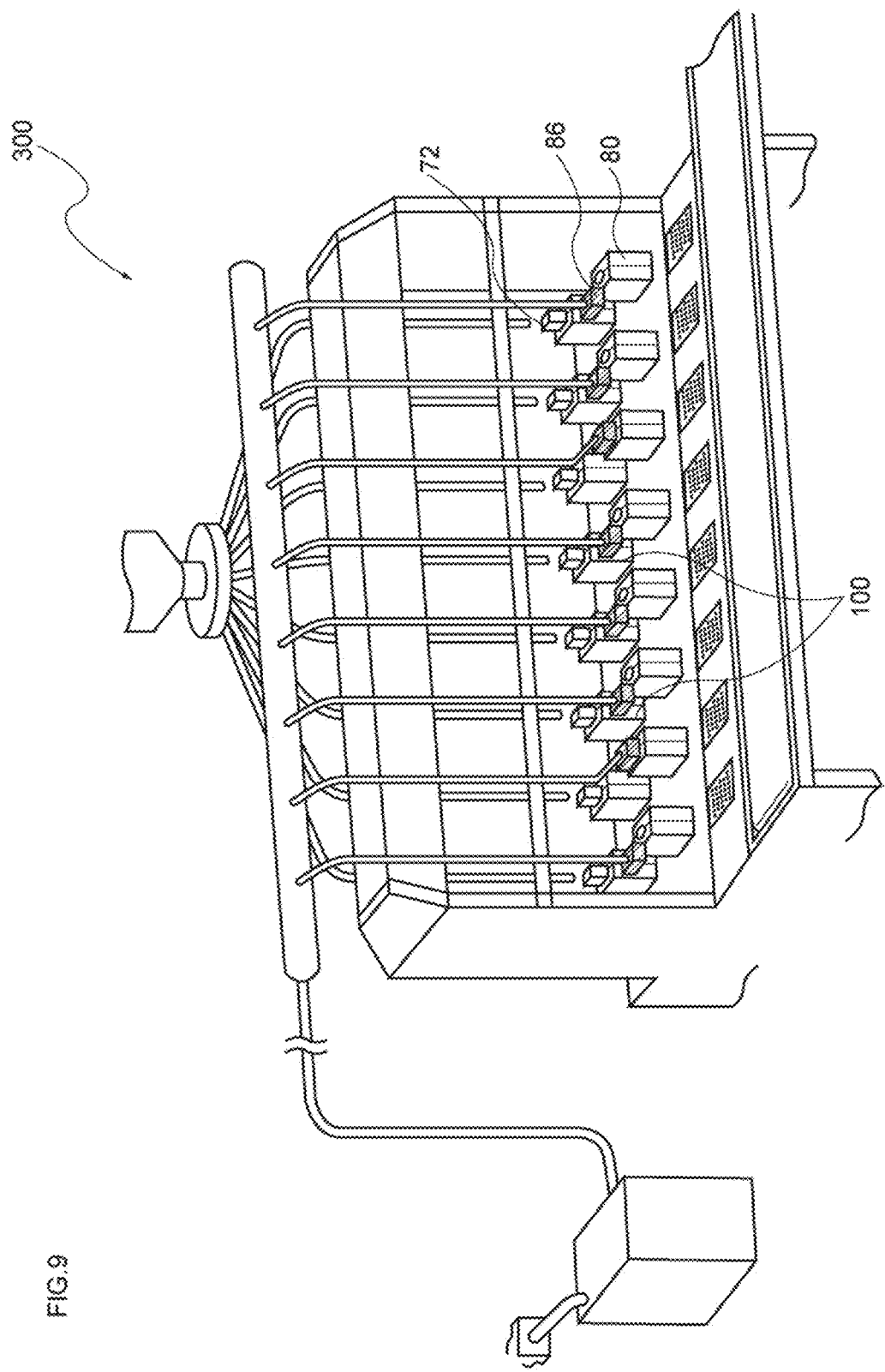

GLASS CONTAINER AND ONE-PRESS METHOD FOR PRODUCING GLASS CONTAINER

BACKGROUND OF THE INVENTION

Field of the Invention

The present invention relates to a glass container having multiple concavities at the bottom of a mouth provided with a rim, and a one-press method for producing the glass container.

Description of the Related Art

Conventionally, a solid cosmetic material produced by consolidating a powdered cosmetic material such as a powder foundation or a face powder is typically accommodated in a container made of plastic or paper.

A plastic container or a paper container has the advantage that, since it is easy to form multiple accommodation compartments, multiple kinds of solid cosmetic materials can be accommodated side by side in a single container, and superior usability is experienced at the time of applying makeup (see, for example, JP 2011-19649 A).

That is, JP 2011-19649 A discloses, as illustrated in FIGS. 30(a) to 30(c), a cosmetic container 410 having a concave storage part 415 that is to be filled with a cosmetic material, the cosmetic container having a main body 411 provided with a through-hole 414 that forms a wall surface 417 of the storage part 415; and a bottom 418 that is fixed at the lower surface of the main body 411 so as to block up the through-hole 414 and forms a bottom plane of the storage part 415. In the cosmetic container 410, the main body 411 has a wall surface 417 of the storage part 415 formed into a porous surface that is interpenetrated by the cosmetic material, and is configured as a foamed body that relieves the impact transferred to the lateral sides of the storage part 415 from the outside of the main body 411.

On the other hand, although it is not related to a container intended to accommodate multiple kinds of solid cosmetic materials, JP 2000-211930 A discloses, as a method for producing a thick-walled glass container having a feeling of high quality, a one-press bottle making method including a pressing step of inserting a plunger into a finish mold filled with molten glass called gob, and molding a glass container having a finished shape; and a cooling step of moving this glass container having a finished shape into a cooling mold, and forcing cooling of the outer peripheral surface and the inner peripheral surface of the glass container having a finished shape, respectively with cooling air that is blown into the interior of the cooling mold and cooling air that is blown into the interior of the glass container having a finished shape.

That is, as illustrated in FIG. 31, a one-press bottle making method of forcing cooling of the inner peripheral surface and the outer peripheral surface of a glass container 510 having a finished shape, respectively, using cooling air 512 that is blown into the interior of the glass container 510 having a finished shape and cooling air 514 that is blown into the interior of a cooling mold 500.

SUMMARY OF THE INVENTION

However, since the design characteristics and the feeling of high quality of the cosmetic container described in JP 2011-19649 A are unsatisfactory, the cosmetic container may not sufficiently meet the requirements of consumers from that point of view.

On the other hand, if a glass container having multiple accommodation compartments were produced using the one-press bottle making method described in JP2000-211930 A, distortion might occur at the partition sections between the multiple accommodation compartments, or defects may occur at the rim portion (hereinafter, referred to as "rim") of the mouth or at the partition sections. Thus, it is difficult to produce the desired glass container stably.

Thus, the inventors of the present invention conducted a thorough investigation in view of the problems described above, and they found that in regard to a one-press process, when the temperature of the gob and the temperature of the plunger are respectively regulated to predetermined ranges, even in a case in which multiple concavities are formed at the bottom plane of a mouth provided with a rim, the occurrence of distortion or defects can be effectively suppressed. Thus, the inventors completed the present invention.

That is, an object of the present invention is to provide a glass container having multiple concavities at the bottom plane of a mouth provided with a rim, and a one-press method for producing a glass container, by which such a glass container can be produced with a satisfactory yield.

According to an aspect of the invention, there is provided a glass container having a body and a mouth provided with a rim, the glass container having multiple concavities at the bottom plane of the mouth provided with a rim. Thus, the problems described above can be addressed.

That is, since the glass container of the invention has multiple concavities, multiple solid cosmetic materials such as powder foundations or face powders can be accommodated side by side, and the usability at the time of applying makeup can be effectively enhanced.

Furthermore, since multiple concavities are formed at the bottom plane of the mouth provided with a rim, the solid cosmetic materials accommodated in the multiple concavities can be prevented from being directly exposed to wind and causing powder flying.

Also, when a film is dropped down on the inner side of the rim, the occurrence of powder flying within the container in a state of being closed with a lid can also be easily suppressed.

Since the container of the invention is made of glass, the appearance shape can be relatively freely designed, and therefore, the container exhibits superior designability. Also, since the container has an appropriate weighty feeling and a satisfactory texture, the glass container can evoke a feeling of high quality that is absent in plastic containers and the like.

Furthermore, on the occasion of configuring the glass container of the invention, it is preferable to adjust the number of concavities to a value within the range of 2 to 4.

When such a configuration is adopted, usability and designability can be further enhanced while distortion at the partition section between the multiple concavities and the occurrence of defects in the rim or the partition section is effectively suppressed.

On the occasion of configuring the glass container of the invention, it is preferable to adjust the thickness of the rim to a value within the range of 2 to 4 mm.

When such a configuration is adopted, usability and designability can be further enhanced while the occurrence of defects in the rim is effectively suppressed.

Furthermore, on the occasion of configuring the glass container of the invention, it is preferable to adjust the height of the rim to a value within the range of 2 to 12.5 mm.

When such a configuration is adopted, usability and designability can be further enhanced while the occurrence of defects in the rim is effectively suppressed.

On the occasion of configuring the glass container of the invention, it is preferable to adjust the thickness at the thinnest portion of the partition section between multiple adjoining concavities to a value within the range of 2 to 4.5 mm.

When such a configuration is adopted, usability and designability can be further enhanced while the occurrence of defects in the rim or the partition section is effectively suppressed.

On the occasion of configuring the glass container of the invention, it is preferable to adjust the depth of the concavities to a value within the range of 7.5 to 16 mm.

When such a configuration is adopted, usability and designability can be further enhanced while the occurrence of defects in the rim or the partition section is effectively suppressed.

Furthermore, on the occasion of configuring the glass container of the invention, it is preferable to adjust the total proportion of the opening areas of the multiple concavities with respect to the opening area of the mouth, as viewed from the mouth side, to a value within the range of 50% to 93%.

When such a configuration is adopted, usability and designability can be further enhanced while distortion at the partition section between multiple concavities and the occurrence of defects in the rim or the partition section is effectively suppressed.

According to another aspect of the present invention, there is provided a one-press method for producing the glass container described above, the method including the following Steps (A) to (E):

(A) a step of fitting a funnel into a molding mold, and then introducing a gob at 1090° C. to 1150° C. into the molding mold through the funnel;

(B) a step of removing the funnel from the molding mold, and then fitting a baffle into the molding mold;

(C) a step of regulating the temperature of the molding surface section of a plunger having multiple convex surfaces on its molding surface section to a value within the range of 270° C. to 370° C., subsequently inserting the plunger into the molding mold from the side opposite to the side where the baffle is fitted, subsequently pressing the gob, and thereby molding a glass container having a finished shape from the gob;

(D) a step of pulling out the plunger from the glass container having a finished shape; and (E) a step of transferring the glass container having a finished shape into a cooling mold and cooling the glass container.

That is, when the one-press method for producing a glass container of the invention is used, since the temperature of the gob and the temperature of the plunger are respectively regulated into predetermined ranges, distortion at the partition section between multiple concavities and the occurrence of defects in the rim or the partition section can be effectively suppressed, and thereby a predetermined glass container can be produced with good yield.

Furthermore, on the occasion of performing the one-press method for producing the glass container of the invention, it is preferable to adjust the difference obtained by subtracting the temperature of the molding surface section in Step (C) from the temperature of the gob in Step (A) to a value within the range of 740° C. to 810° C.

When the method is performed in this manner, distortion at the partition section and the occurrence of defects in the rim or the partition section can be suppressed more effectively.

On the occasion of performing the one-press method for producing a glass container of the invention, it is preferable that the inner peripheral surface of the molding surface section is cooled in Step (C) by blowing cooling air to the inner peripheral surface.

When the method is performed in this manner, distortion at the partition section can be suppressed more effectively.

On the occasion of performing the one-press method for producing a glass container of the invention, it is preferable that the outer peripheral surface of the molding surface section is cooled in Step (C) by blowing cooling air to the outer peripheral surface.

When the method is performed in this manner, distortion in the partition section can be suppressed more effectively.

BRIEF DESCRIPTION OF THE DRAWINGS

FIG. 2 is a diagram provided to explain a distortion at the partition section and defects in the rim or the partition section.

FIG. 9 is a diagram provided to explain a one-press apparatus for producing a glass container.

DETAILED DESCRIPTION OF THE PREFERRED EMBODIMENTS

First Embodiment

A first embodiment of the invention relates to a glass container having a body and a mouth provided with a rim, the glass container having multiple concavities at the bottom plane of the mouth provided with a rim.

The first embodiment of the invention will be specifically explained below with appropriate reference to the drawings.

1. Shape

Figure 1A:
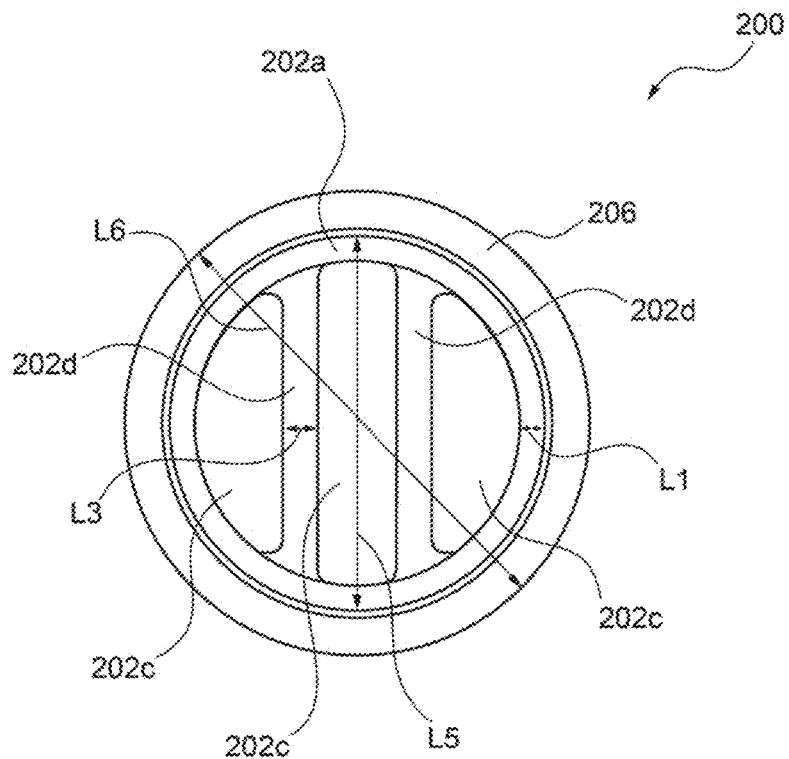
FIGS. 1(a) and 1(b) are diagrams provided to explain the glass container of the invention.
Figure 1B:
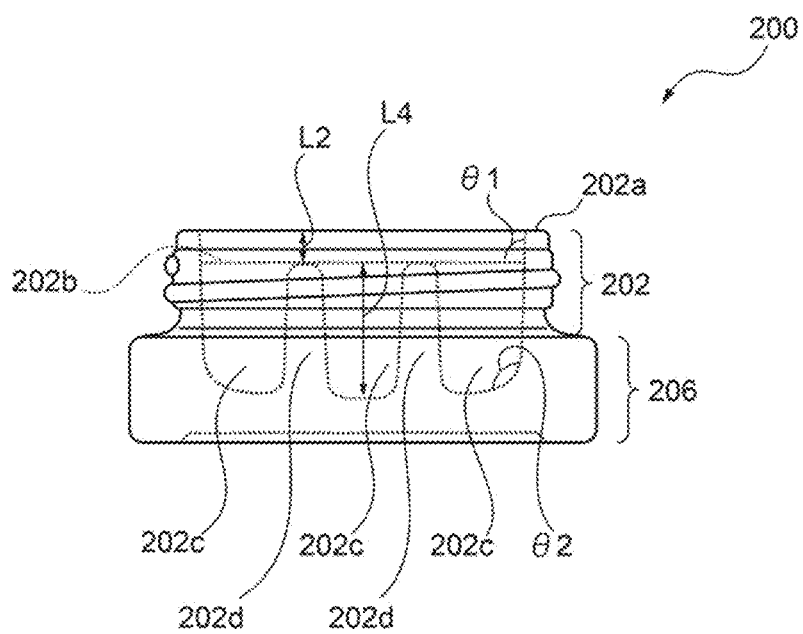

As illustrated in FIGS. 1(a) and 1(b), the glass container 200 of the invention is a glass container 200 having a mouth 202 provided with a rim 202a; and a body 206, the glass container having multiple concavities 202c at the bottom plane 202b of the mouth 202 provided with a rim 202a.

The reason for which such a configuration is adopted is that it can prevent solid cosmetic materials accommodated in the multiple concavities 202c from being directly exposed to wind and causing powder flying.

Furthermore, when a film is dropped down on the inner side of the rim 202a, the occurrence of powder flying within the container in a state of being closed with a lid can also be easily suppressed.

FIG. 1(a) is a plan view of a glass container 200 having three concavities 202c, and FIG. 1(b) is a lateral view of this glass container 200.

Furthermore, it is preferable to adjust the thickness L1 of the rim 202a illustrated in FIG. 1(a) to a value within the range of 2 to 4 mm.

The reason for this is that if the thickness L1 of the rim 202a has a value of below 2 mm, the glass container may be easily damaged, or usability and designability are likely to be excessively deteriorated. On the other hand, if the thickness L1 of the rim 202a has a value of above 4 mm, defects are likely to occur excessively in the rim 202a.

Therefore, it is more preferable to adjust the lower limit of the thickness L1 of the rim 202a to a value of 2.3 mm or more, and even more preferably to a value of 2.5 mm or more.

Furthermore, it is more preferable to adjust the upper limit of the thickness L1 of the rim 202a to a value of 3.1 mm or less, and even more preferably to a value of 2.6 mm or less.

Defects in the rim 202a are, as illustrated in FIG. 2, streak-like marks extending not only to the surface of glass, but also to the interior of glass.

Such a defect B is not a defect originating from the parting line of the molding mold as judged based on the site of generation.

Also, the defect B may also occur in the partition section 202d.

The generation mechanism for the defect B in the rim 202a or the partition section 202d will be explained in the second embodiment.

FIG. 2 is a perspective view of the glass container 200 having a distortion D and a defect B.

It is also preferable to adjust the height L2 of the rim 202a from the bottom plane 202b of the mouth 202 illustrated in FIG. 1(b), to a value within the range of 2 to 12.5 mm.

The reason for this is that if the height L2 of the rim 202a has a value of below 2 mm, it may be difficult for the rim 202a to sufficiently exhibit its function, and usability and designability may be excessively deteriorated. On the other hand, if the height L2 of the rim 202a has a value of above 12.5 mm, defects are likely to occur excessively in the rim 202a.

Therefore, it is more preferable to adjust the lower limit of the height L2 of the rim 202a to a value of 3 mm or more, and even more preferably to a value of 3.5 mm or more.

Furthermore, it is more preferable to adjust the upper limit of the height L2 of the rim 202a to a value of 6.5 mm or less, and even more preferably to a value of 4.5 mm or less.

Furthermore, the planar shape of the rim 202a is not particularly limited; however, it is preferable to adopt, for example, a circular shape, an elliptical shape, or a polygonal shape.

The lateral cross-sectional shape of the rim 202a is not particularly limited as long as it is a shape that can be formed by a one-press method; however, from the viewpoint of securing a wide planar area of the bottom plane 202b at which the multiple concavities 202c are formed, it is preferable that the angle θ1 formed by the inner wall of the rim 202a with respect to the bottom plane 202b is adjusted to a value within the range of 80° to 87°, as illustrated in FIG. 1(b).

As illustrated in FIGS. 1 and 3 to 5, it is preferable to adjust the number of the concavities 202c to a value within the range of 2 to 4.

The reason for this is that when the number of the concavities 202c is adjusted to a value within such a range, usability and designability can be further enhanced while distortion at the partition section 202d between the multiple concavities 202c, and the occurrence of defects in the rim 202a or the partition section 202d are effectively suppressed.

However, from the viewpoint of more effectively suppressing distortion at the partition section 202d between the multiple concavities 202c and the occurrence of defects in the rim 202a or the partition section 202d, it is more preferable to adjust the upper limit of the number of the concavities 202c to a value of 3 or less, and even more preferably to a value of 2.

Meanwhile, the term distortion at the partition section 202d between the multiple concavities 202c means that, as illustrated in FIG. 2, the partition section 202d is literally distorted in a transverse direction or is partially depressed downward.

Furthermore, the generation mechanism for the distortion D at the partition section 202d will be explained in the second embodiment.

Figure 3A:
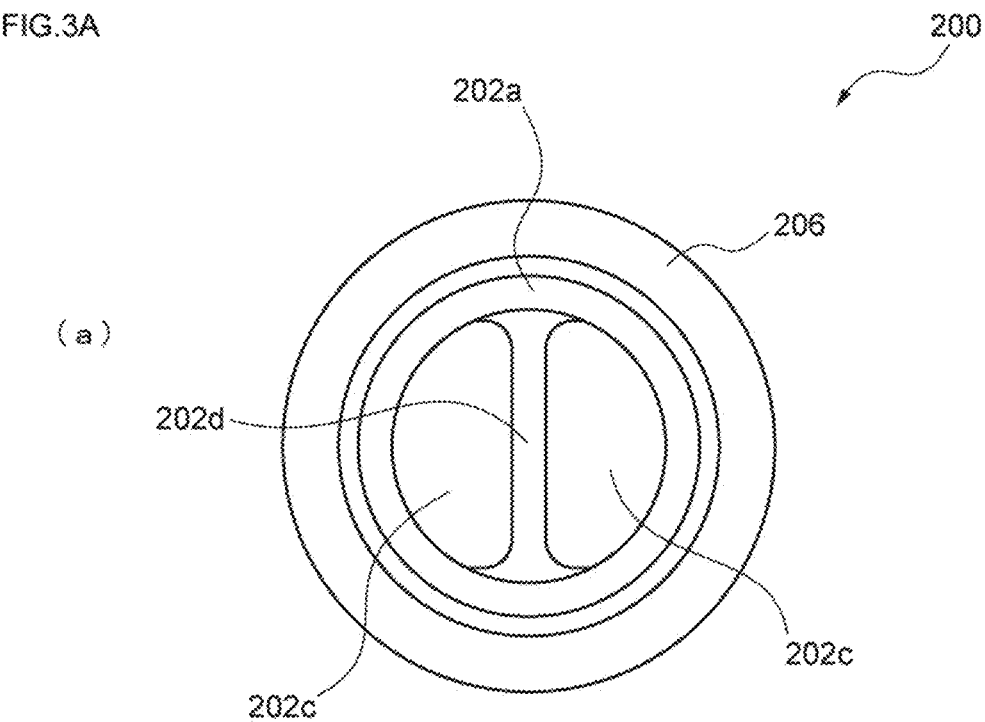
FIGS. 3(a) and 3(b) are other diagrams provided to explain the glass container of the invention.
Figure 3B:
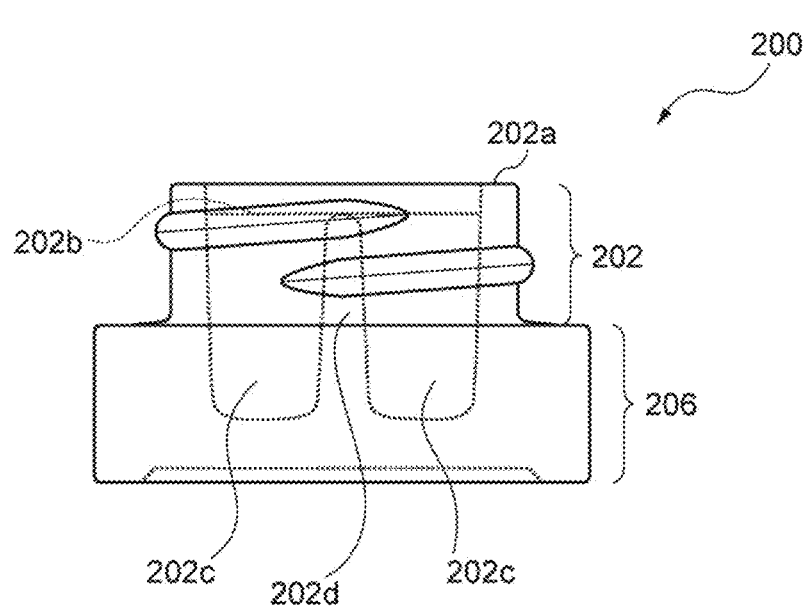

FIG. 3(a) is a plan view of a glass container 200 having two concavities 202c, and FIG. 3(b) is a lateral view of this glass container 200.

Figure 4A:
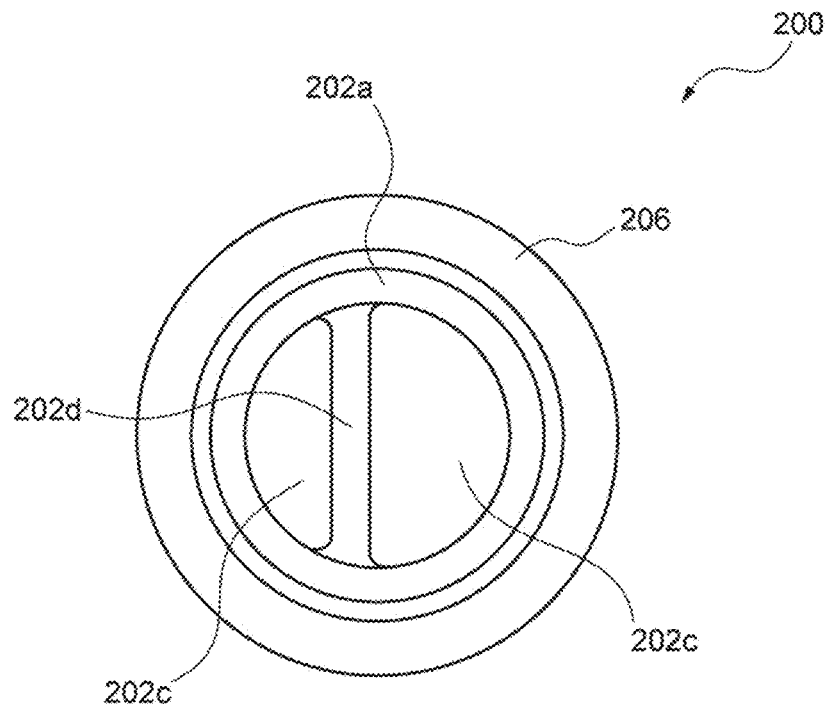
FIGS. 4(a) and 4(b) are still other diagrams provided to explain the glass container of the invention.
Figure 4B:
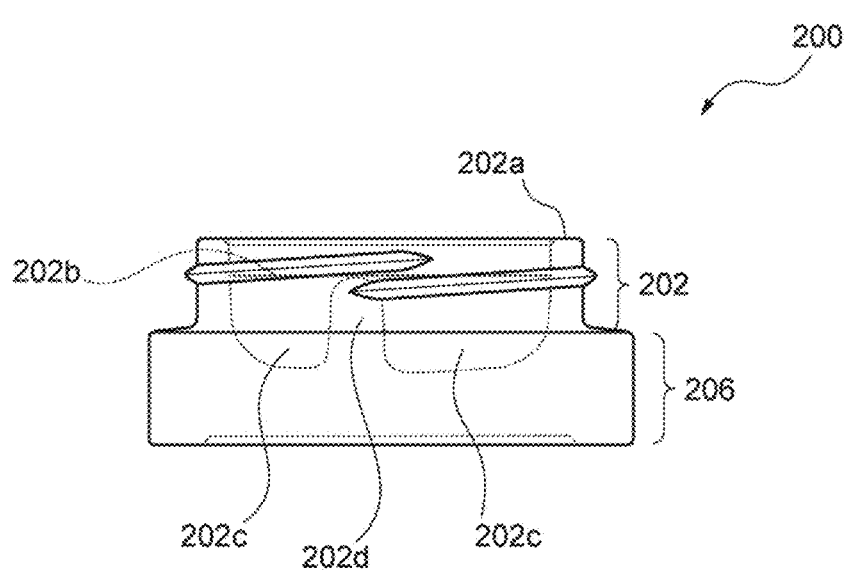

FIG. 4(a) is a plan view of a glass container 200 having two unequal concavities 202c, and FIG. 4(b) is a lateral view of this glass container 200.

Figure 5A:
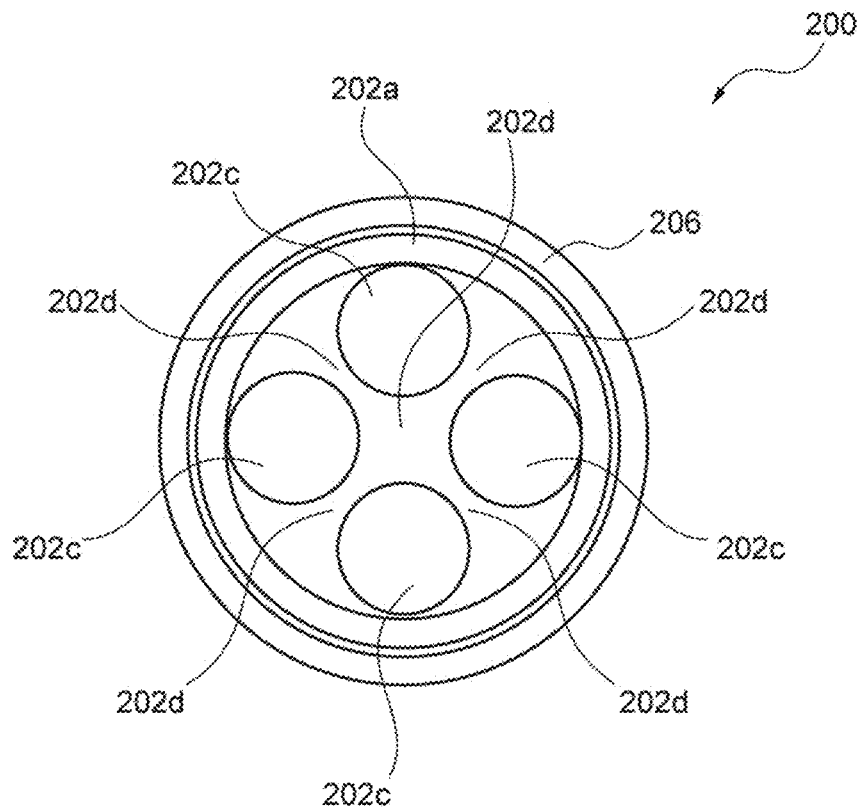
FIGS. 5(a) and 5(b) are still other diagrams provided to explain the glass container of the invention.
Figure 5B:
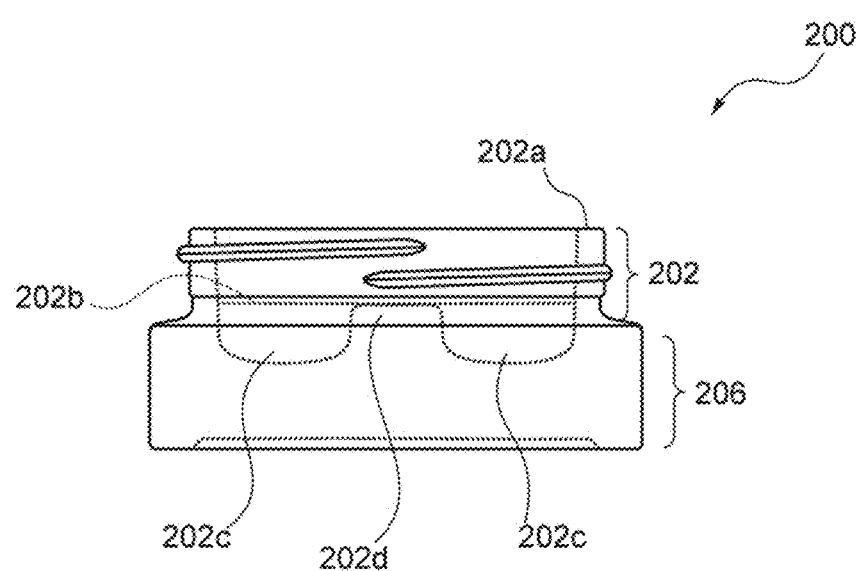

FIG. 5(a) is a plan view of a glass container 200 having four concavities 202c, and FIG. 5(b) is a lateral view of this glass container 200.

It is preferable that the thickness L3 of the thinnest portion in the partition section 202d between multiple adjoining concavities 202c as illustrated in FIG. 1(a) is adjusted to a value within the range of 2 to 4.5 mm.

The reason for this is that if the thickness L3 of the thinnest portion has a value of below 2 mm, usability and designability of the glass container 200 may be excessively deteriorated. On the other hand, if the thickness L3 of the thinnest portion as such has a value of above 4.5 mm, distortion at the partition section 202d and defects in the rim 202a or the partition section 202d are likely to occur excessively.

Therefore, it is more preferable to adjust the lower limit of the thickness L3 of the thinnest portion of the partition section 202d between multiple adjoining concavities 202c, to a value of 2.15 mm or more, and even more preferably to a value of 2.3 mm or more.

Also, it is more preferable to adjust the upper limit of the thickness L3 of the thinnest portion of the partition section 202d between multiple adjoining concavities 202c to a value of 3.5 mm or less, and even more preferably to a value of 3 mm or less.

Furthermore, it is preferable to adjust the depth L4 of the concavities 202c illustrated in FIG. 1(b) to a value within the range of 7.5 to 16 mm.

The reason for this is that if the depth L4 of such concavities 202c has a value of below 7.5 mm, usability and designability of the glass container 200 may be deteriorated excessively. On the other hand, if the depth L4 of the concavities 202c has a value of above 16 mm, distortion at the partition section 202d and defects in the rim 202a or the partition section 202d are likely to occur excessively.

Therefore, it is more preferable to adjust the lower limit of the depth L4 of the concavities 202c to a value of 9 mm or more, and even more preferably to a value of 11 mm or more.

Furthermore, it is more preferable to adjust the upper limit of the depth L4 of the concavities 202c to a value of 15 mm or less, and even more preferably to a value of 14 mm or less.

As viewed from the side of the mouth 202 in FIG. 1(a), it is preferable that the total proportion of the opening areas of the multiple concavities 202c with respect to the opening area of the mouth 202, that is, the planar area on the inner side of the rim 202a, is adjusted to a value within the range of 50% to 93%.

The reason for this is that if the value of the proportion is below 50%, usability and designability may be deteriorated excessively. On the other hand, if the proportion has a value of above 93%, distortion at the partition section 202d and defects in the rim 202a or the partition section 202d are likely to occur excessively.

Therefore, it is more preferable to adjust the lower limit of the total proportion of the opening areas of the multiple concavities 202c with respect to the opening area of the mouth 202 to a value of 70% or more, and even more preferably to a value of 80% or more.

Furthermore, it is more preferable to adjust the upper limit of the total proportion of the opening area of the multiple concavities 202c with respect to the opening area of the mouth 202, to a value of 90% or less, and even more preferably to a value of 87% or less.

Furthermore, the planar shape of the concavities 202c is not particularly limited; however, for example, it is preferable to adopt a circular shape, an elliptical shape, a polygonal shape, a fan shape, or a crescent shape.

More specifically, FIGS. 1 and 3 to 5 illustrate glass containers 200 in which the planar shape of the concavities 202c is a crescent shape, a rectangular shape, and a circular shape.

Furthermore, the cross-sectional shape of the concavities 202c is not particularly limited as long as it is a shape that can be formed by a one-press method; however, from the viewpoint of stably accommodating a solid cosmetic material obtained by consolidating a powdered cosmetic material, it is preferable to adjust the angle θ2 formed by the inner wall of a concavity 202c and the bottom plane to a value within the range of 80° to 87°, as illustrated in FIG. 1(b).

Furthermore, as illustrated in FIG. 1(a), it is preferable to adjust the maximum diameter L5 of the mouth 202 to a value within the range of 20 to 60 mm.

On the outer surface of the mouth 202, a thread to be screwed into a lid member may also be formed.

It is also preferable adjust the maximum diameter L6 of the body 206 to be equal to the maximum diameter L5 of the mouth 202, or to have a value larger than the maximum diameter L5 by about 35 to 70 mm.

The shape of the body 206 is not particularly limited, and for example, it is preferable to adopt a cylindrical shape or a prism shape.

2. Material

The kind of the glass that constitutes the glass container is not particularly limited, and examples of the glass include soda lime glass, borosilicate glass, lead glass, phosphate glass, and aluminosilicate glass.

Regarding the glass that constitutes the glass container, it is preferable to use colorless transparent glass; however, it is also preferable to use colored transparent glass or colored translucent glass.

In a case in which colorless transparent glass is used, the color of the content accommodated in the glass container can be made sufficiently recognizable from the outside, and also, the color of the content can be made more clearly recognizable by utilizing internal reflection of light.

On the other hand, in a case in which colored transparent glass or colored translucent glass is used, a glass container having superior designability can be obtained, as a result of a synergistic effect between the color tone of the content and the color tone of the glass, by utilizing internal reflection of light.

Second Embodiment

According to a second embodiment of the invention, there is provided a one-press method for producing the glass container of the first embodiment, the method including the following Steps (A) to (E):

(A) a step of fitting a funnel into a molding mold, and then introducing a gob at 1090° C. to 1150° C. into the molding mold through the funnel;

(B) a step of detaching the funnel from the molding mold, and then fitting a baffle into the molding mold;

(C) a step of regulating the temperature of the molding surface section of a plunger having multiple convex surfaces on its molding surface section to a value within the range of 270° C. to 370° C., subsequently inserting the plunger into the molding mold from the side opposite to the side where the baffle is fitted, subsequently pressing the gob, and thereby molding a glass container having a finished shape from the gob;

(D) a step of pulling out the plunger from the glass container having a finished shape; and (E) a step of transferring the glass container having a finished shape into a cooling mold and cooling the glass container.

In the following description, the second embodiment of the invention will be specifically explained mainly based on the differences between the second embodiment and the first embodiment, with reference to the drawings.

1. Overview of the One-Press Method

The one-press method for producing a glass container of the invention includes predetermined Steps (A) to (E).

Therefore, first, summaries of the respective steps will be explained using FIGS. 6 to 8, and then the one-press apparatus for producing a glass container, and the molding mold, plunger, funnel, baffle, blow head, cooling mold and the like that are parts of the one-press apparatus for producing a glass container will be specifically explained.

Figure 7A:
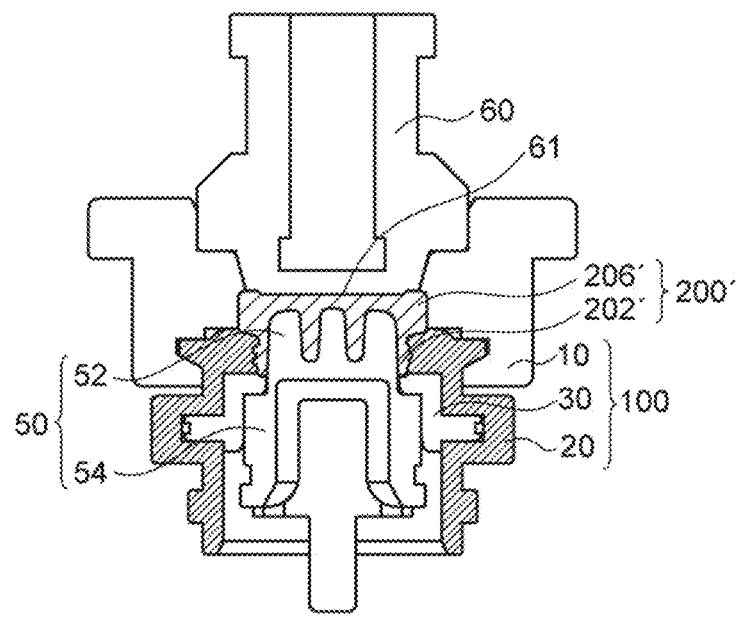
FIGS. 7(a) and 7(b) are diagrams provided to explain an overview of Steps (C) and (D) with regard to the one-press method for producing a glass container of the invention.
Figure 7B:
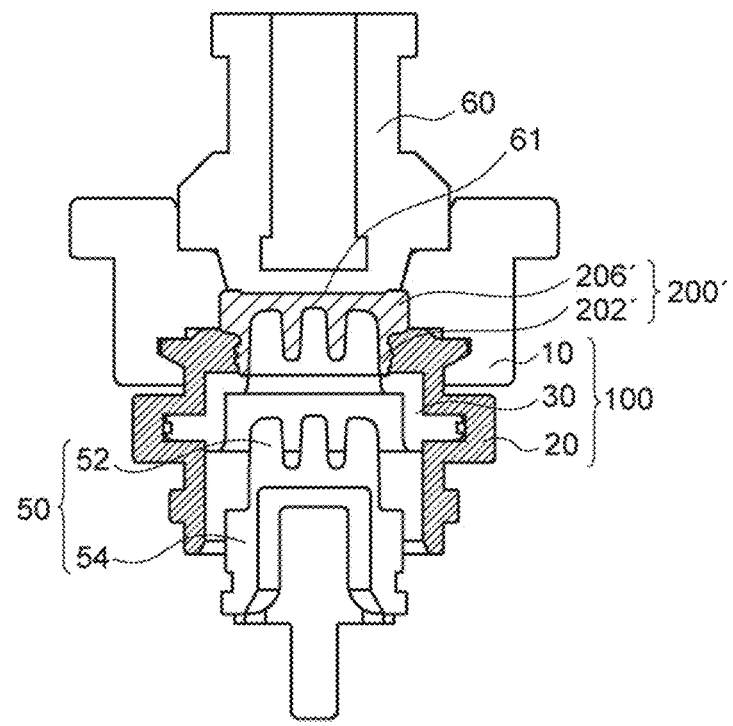
Figure 8A:
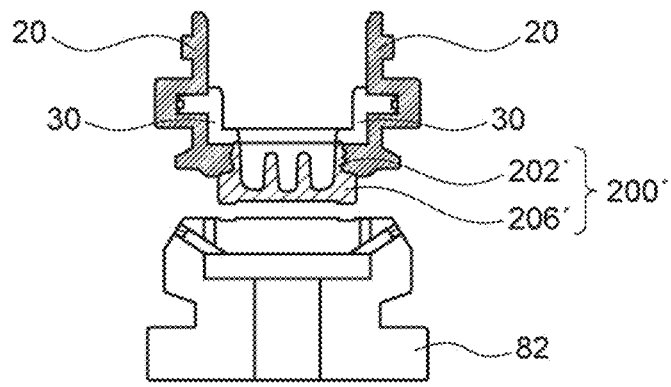
FIGS. 8(a) to 8(c) are diagrams provided to explain an overview of Step (E) with regard to the one-press method for producing a glass container of the invention.
Figure 8B:
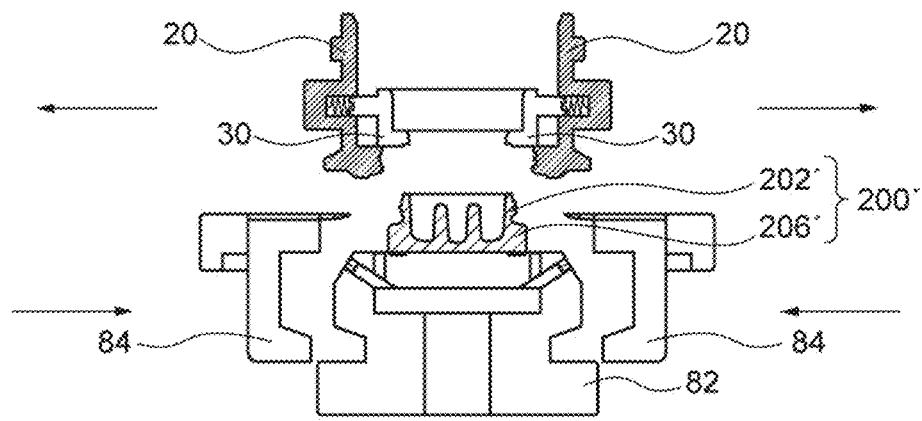

Meanwhile, FIGS. 6 to 8 are cross-sectional views obtainable in a case in which the entirety including a molding mold 100, a plunger 50 and the like is cut at a plane that orthogonally intersects a bisecting cross-section for splitting the molding mold 100 into two and opening the molding mold 100, and the cut surface is viewed from the front.

(1) Step (A)

Figure 6A:
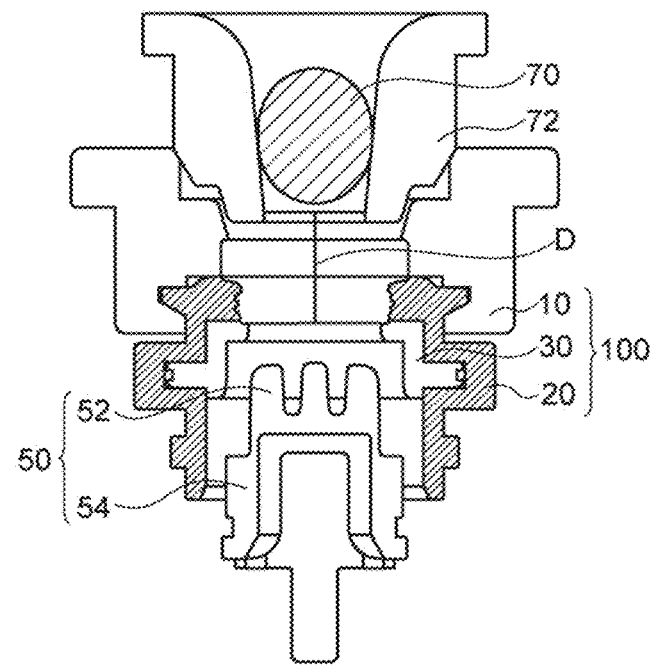
FIGS. 6(a) and 6(b) are diagrams provided to explain an overview of Steps (A) and (B) with regard to the one-press method for producing a glass container of the invention.

Step (A) is a step of fitting a funnel 72 into a molding mold 100, and then introducing a gob 70 into the interior of the molding mold 100 through the funnel 72, as illustrated in FIG. 6(a).

At this time, according to the invention, the temperature $T_G$ of the gob 70 to be introduced is adjusted to a value within the range of 1090° C. to 1150° C.

The reason for this is that if the temperature $T_G$ of the gob 70 is below 1090° C., when the gob 70 is pressed with the plunger 50 in Step (C), fluidity of the gob 70 may be excessively deteriorated, and as a result, defects are likely to occur excessively in the rim or the partition section, as will be described below. On the other hand, if the temperature $T_G$ of the gob 70 is above 1150° C., the molding surface section 52 of the plunger 50 is likely to be excessively heated in Step (C), or the gob 70 is likely to pass through the molding mold 100 and leak downward.

Therefore, it is more preferable to adjust the lower limit of the temperature $T_G$ of the gob 70 to a value of 1100° C. or higher, and even more preferably to a value of 1110° C. or higher.

Furthermore, it is more preferable to adjust the upper limit of the temperature $T_G$ of the gob 70 to a value of 1140° C. or lower, and even more preferably to a value of 1130° C. or lower.

The "temperature $T_G$ of the gob 70 to be introduced" according to the invention more specifically means the temperature of the gob 70 just before it is introduced.

(2) Step (B)

Figure 6B:
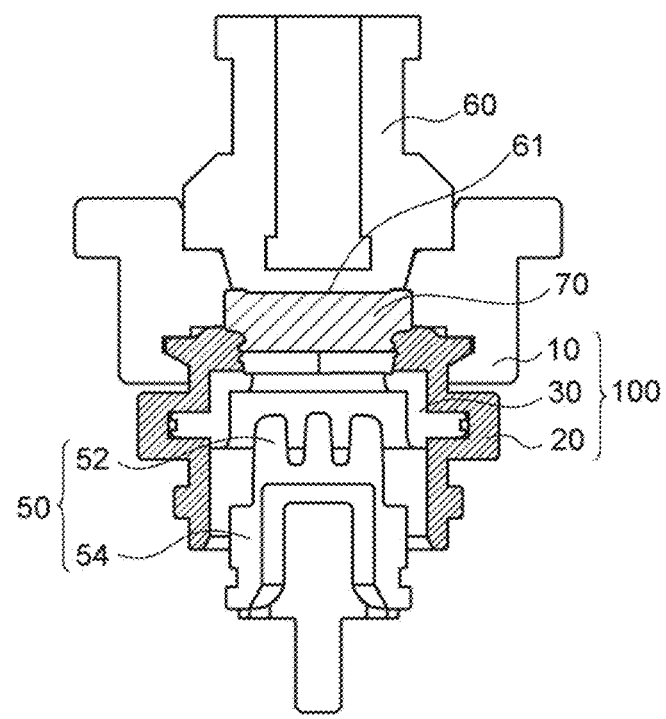

Step (B) is a step of detaching the funnel 72 from the molding mold 100, and then fitting a baffle 60 into the molding mold 100, as illustrated in FIG. 6(b).

(3) Step (C)

Step (C) is a step of inserting a plunger 50 having multiple convex surfaces in the molding surface section 52, into the interior of the molding mold 100 from the side opposite to the side where the baffle 60 is fitted, pressing the gob 70, and thereby molding a glass container 200' having a finished shape from the gob 70, as shown in FIG. 7(a).

In Step (C), when the gob 70 is pressed using the plunger 50, the inner peripheral surface of a mouth 202' and multiple concavities are molded, and at the same time, the outer peripheral surface of the mouth 202' and the outer peripheral surface of the body 206' are also molded.

Furthermore, when the inner peripheral surface and the outer peripheral surface of the mouth 202' are formed, a rim 202a', which is a part of the mouth 202', is also molded.

The end surfaces of the partition section in the glass container 200' having a finished shape are molded by the concave portions between the multiple convex surfaces on the plunger 50.

In this case, according to the invention, the temperature $T_P$ of the molding surface section 52 in the plunger 50 is adjusted to a value within the range of 270° C. to 370° C.

The reason for this is that if the temperature $T_P$ of the molding surface section 52 has a value of below 270° C., wrinkles are likely to occur in the concavities 202c or the partition section 202d. On the other hand, if the temperature $T_P$ of the molding surface section 52 has a value of above 370° C., the temperature of the partition section of the multiple concavities in the glass container 200' having a finished shape is elevated excessively, and as a result, distortion is likely to occur on this site, as will be described below.

Therefore, it is more preferable to adjust the lower limit of the temperature $T_P$ of the molding surface section 52 to a value of 290° C. or higher, and even more preferably to a value of 310° C. or higher.

It is also more preferable to adjust the upper limit of the temperature $T_P$ of the molding surface section 52 to a value of 350° C. or lower, and even more preferably to a value of 330° C. or lower.

Regulation of $T_P$ is basically achieved by cooling of the molding surface section that has been heated by pressing of the gob; however, at the time when the molding surface section has not yet been heated, such as the early stage of driving of the one-press apparatus, it is not necessary to deliberately perform cooling.

Furthermore, it is preferable that the value of the difference, $T_G$-$T_P$, obtained by subtracting the temperature $T_P$ of the molding surface section in Step (C) from the temperature $T_G$ of the gob in Step (A) is adjusted to a value within the range of 740° C. to 810° C.

The reason for this is that if the value of $T_G$-$T_P$ is below 740° C., as a first alternative, $T_G$ is excessively low and fluidity of the gob 70 is then excessively deteriorated. As a result, defects are likely to occur excessively in the rim or the partition section. As second alternative, $T_P$ is excessively high and the temperature of the partition section of the multiple concavities in the glass container 200' having a finished shape rises excessively. As a result, distortion is likely to occur on this site as will be described below. On the other hand, it is because if the value of $T_G$-$T_P$ has a value of above 810° C., as a first alternative, $T_G$ is excessively high, and the molding surface section 52 of the plunger 50 is then likely to be heated excessively, or the gob 70 is likely to pass through the molding mold 100 and leak downward. As a second alternative, $T_P$ is excessively low, and wrinkles are likely to occur in the concavities 202c or the partition section 202d.

Therefore, it is more preferable that the lower limit of the difference, $T_G$-$T_P$, obtained by subtracting the temperature $T_P$ of the molding surface section in Step (C) from the temperature $T_G$ of the gob in Step (A), is adjusted to a value of 760° C. or higher, and even more preferably to a value of 780° C. or higher.

Also, it is more preferable to adjust the upper limit of the value of $T_G$-$T_P$ to a value of 805° C. or lower, and even more preferably to a value of 800° C. or lower.

The method for regulating the temperature of the molding surface section 52 in the plunger 50 is not particularly limited; however, it is preferable that the inner peripheral surface of the molding surface section 52 is cooled by blowing cooling air.

The reason for this is that when the molding surface section 52 is cooled from the inner side, latent heat of the molding surface section 52 can be efficiently removed, and the temperature of the molding surface section 52 can be stably regulated to a predetermined range.

Furthermore, it is also preferable that the outer peripheral surface of the molding surface section 52 is cooled by blowing cooling air.

The reason for this is that when the molding surface section 52 is cooled from the outer side, the surface of the molding surface section 52 that is directly contacted with the gob can be efficiently cooled.

From the viewpoint of cooling more efficiently, it is particularly preferable that both the inner peripheral surface and the outer peripheral surface of the molding surface section 52 are cooled by blowing cooling air.

The temperature of the cooling air is preferably adjusted to a value within the range of 0° C. to 40° C., the pressure of the cooling air is preferably adjusted to a value within the range of 0.15 to 0.25 MPa, and the supply time for the cooling air is preferably adjusted to a value within the range of 1.1 to 1.7 seconds.

Regarding the method of blowing cooling air to the inner peripheral surface of the molding surface section 52, it is preferable to perform the method by installing an internal cooling device, which will be described below, to the plunger 50.

From the viewpoint of efficiently implementing cooling, it is preferable that blowing of the cooling air to the inner peripheral surface of the molding surface section 52 is performed to be synchronized with the motion of the plunger 50, and more specifically, it is preferable that the cooling air is blown when the plunger 50 is being pressed against the gob.

Regarding the method for blowing cooling air to the outer peripheral surface of the molding surface section 52, for example, it is preferable that an air blowing device having a nozzle-like air supply outlet is installed in an individual section machine (IS machine) that will be described below, and cooling air is blown to the outer peripheral surface of the molding surface section 52 directly from the nozzle-like air supply outlet.

After the molding surface section 52 of the plunger 50 has been completely inserted into the gob 70, the state is maintained unchanged until the gob 70 is cooled to the extent that the surface of the gob 70 retains a certain shape. Thus, a glass container 200' having a finished shape is molded.

(4) Step (D)

Step (D) is a step of pulling out the plunger 50 from the glass container 200' having a finished shape, as illustrated in FIG. 7(*b*).

That is, Step (D) is a step of pulling out the plunger 50 from the glass container 200' having a finished shape, by moving the plunger 50 downward by reversely tracking the step of moving the plunger 50 upward in Step (C) described above.

(5) Step (E)

Step (E) is a step of transferring the glass container 200' having a finished shape into a cooling mold 80, and cooling the glass container 200', as illustrated in FIG. 8.

More specifically, after the baffle 60 is detached, the molding mold base 10 is split into two and is detached.

At this time point, the mouth 202' of the glass container 200' having a finished shape is sandwiched by means of a neck ring mold 20 connected to an arm (not shown in the diagrams), with the bottom of the glass container facing upward.

Next, the arm is rotated 180° around a fulcrum so as to vertically invert the glass container 200' having a finished shape, and at the same time, the glass container 200' having a finished shape is moved to a position right above a bottom mold 82, which is a part of the cooling mold 80, as illustrated in FIG. 8(*a*).

Next, as illustrated in FIG. 8(*b*), the neck ring mold 20 is split into two and opened. The glass container 200' having a finished shape is then dropped and falls by its own weight to be placed on the bottom mold 82.

Next, as illustrated in FIG. 8(*c*), the two parts of a bisected finishing mold 84, which is a part of the cooling mold 80, are caused to draw closer from two lateral sides, and thereby the glass container 200' having a finished shape is accommodated inside the cooling mold 80.

Next, cooling air is supplied from the lower side of the bottom mold 82. This cooling air is passed through from the lower side toward the upper side through the gap between the outer peripheral surface of the glass container 200' having a finished shape and the inner peripheral surface of the finishing mold 84.

Simultaneously with this, cooling air is also blown to the inner peripheral surface on the mouth 202' side of the glass container 200' having a finished shape, by means of a blow head 86 disposed above the glass container 200' having a finished shape.

Therefore, the outer peripheral surface and the inner peripheral surface of the glass container 200' having a finished shape are simultaneously cooled, and thus a final glass container 200 is obtained.

2. Mechanism of Defect Generation in Rim and Partition Section

Next, the mechanism for the generation of defects B in the rim 202*a* or the partition section 202*d* as illustrated in FIG. 2 will be explained.

That is, the defects B in the rim 202*a* or the partition section 202*d* are generated due to a non-uniformity occurring at the time when, the gob 70 is pressed with a plunger 50 in Step (C) illustrated in FIG. 7(*a*), the gob 70 fluidly spreads between the molding surface section of the molding mold 100 and the molding surface section 52 of the plunger 50.

That is, in the rim or the partition section in the glass container 200' having a finished shape, at which the gob 70 is charged at the last, portions of the gob 70 that have spread non-uniformly in different directions and have circulated around the molding surface section 52 of the plunger 50, join together. Therefore, at the junction, portions of the gob 70 having different thermal histories collide together and are fused.

Therefore, when variation occurs in the thermal histories to a predetermined extent, defects B are generated at the points of junction between different portions of the gob 70.

In particular, according to the invention, since it is necessary to use a plunger 50 having multiple convex surfaces in the molding surface section 52 in order to produce a predetermined glass container 200, spreading of the gob 70 is likely to become non-uniform, and as a result, defects B are likely to be generated in the rim 202*a* and the partition section 202*d*.

Thus, in the present invention, by limiting in Step (A), illustrated in FIG. 6(*a*), the temperature $T_G$ of the gob to be introduced to a value of 1090° C. to 1150° C., higher than a conventional value, the viscosity of the gob 70 is lowered, and fluidity of the gob 70 is increased. Thus, the extent of the differences in the thermal histories of the gob that has non-uniformly spread is controlled so as to be small, and the occurrence of defects B at the points of junction is prevented.

Meanwhile, the temperature of the gob in a conventional one-press process has a value of approximately 1050° C.

3. Mechanism of Occurrence of Distortion at the Partition Section

Next, the mechanism for the occurrence of distortion D at the partition section 202*d* between the multiple concavities 202*c* as illustrated in FIG. 2 will be explained.

That is, distortion D at the partition section 202*d* occurs as the temperature of the molding surface section 52 of the plunger 50 increases excessively in Step (C) illustrated in FIG. 7(*a*).

Such a temperature increase in the molding surface section occurs also in a conventional plunger having a uniform molding surface section when a gob 70 at a high temperature is repeatedly pressed; however, particularly in a case in which a plunger 50 having a molding surface section 52 with a complicated shape as in the case of the present invention is used, the temperature rise becomes noticeable.

This is attributable to the fact that the surface area of the molding surface section 52 becomes large, and that heat is likely to be retained in the portion at which convex surfaces face each other.

Furthermore, according to the invention, from the viewpoint of suppressing the generation of defects B in the rim 202*a* as described above, the temperature of the gob 70 is set to be higher than a conventional temperature.

Therefore, in this invention, the temperature of the molding surface section 52 of the plunger 50 is likely to increase excessively.

As a result, the temperature rises at the bottom section at which convex surfaces face each other, where the temperature is particularly likely to rise, that is, at the concave portion between convex surfaces. Furthermore, at the partition section in the glass container 200' having a finished shape, which is molded by the concave portion between convex surfaces, the temperature can rise more easily than other sections. Accordingly, distortion D is likely to occur in the partition section 202*d* of the glass container 200 thus obtainable.

Thus, according to the invention, the occurrence of distortion D in the partition section 202*d* is suppressed by regulating the temperature of the molding surface section 52 of the plunger 50 to a value within the range of 270° C. to 370° C. in a stage prior to pressing in Step (C) illustrated in FIG. 7(*a*).

4. Apparatus for Producing a Glass Container

Regarding the one-press apparatus for producing a glass container, by which the one-press method for producing a glass container of the invention is performed, as basically illustrated in FIG. 9, an individual section machine (IS machine) 300 can be used.

The IS machine is configured such that a predetermined molding mold 100 is used, and also, a glass container having a finished shape that has been molded by this molding mold 100, is transferred into a cooling mold 80 and then is cooled using a first cooling air flow that is blown from a blow head 86, and a second cooling air flow that is blown along the inner peripheral surface of a finishing mold 84.

That is, a predetermined glass container can be produced only by molding a glass container having a finished shape by one press, and then cooling the glass container having a finished shape in a cooling mold.

Therefore, when such an IS machine is used, for example, a glass container 200 having a particular shape as illustrated in FIGS. 1(*a*) and 1(*b*) can be produced easily and continuously.

FIG. 9 is a perspective view of an IS machine 300.

(1) Molding Mold

Figure 10A:
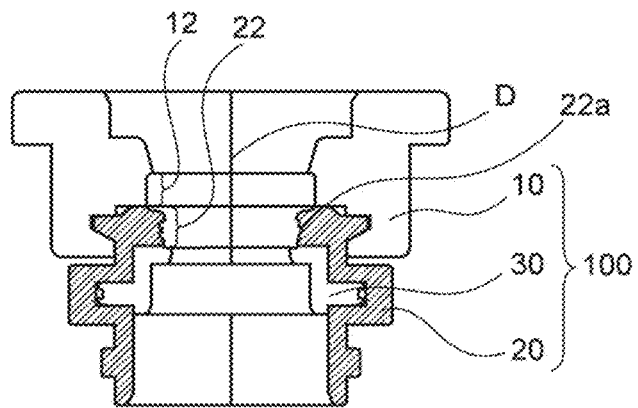
FIGS. 10(a) to 10(c) are diagrams provided to explain a molding mold.
Figure 10B:
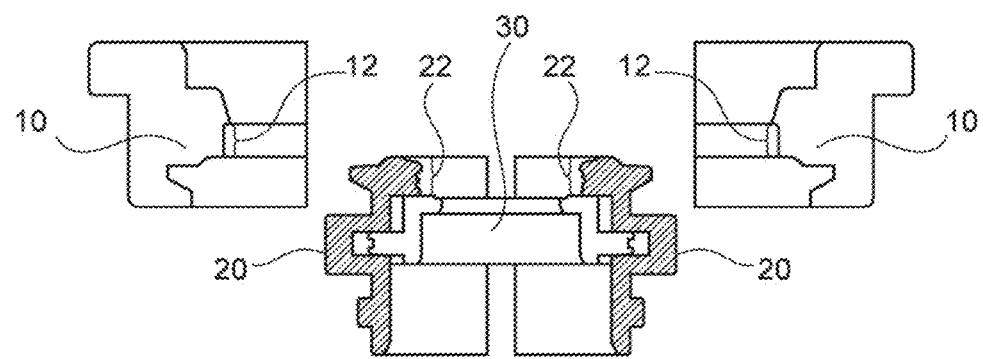
Figure 10C:
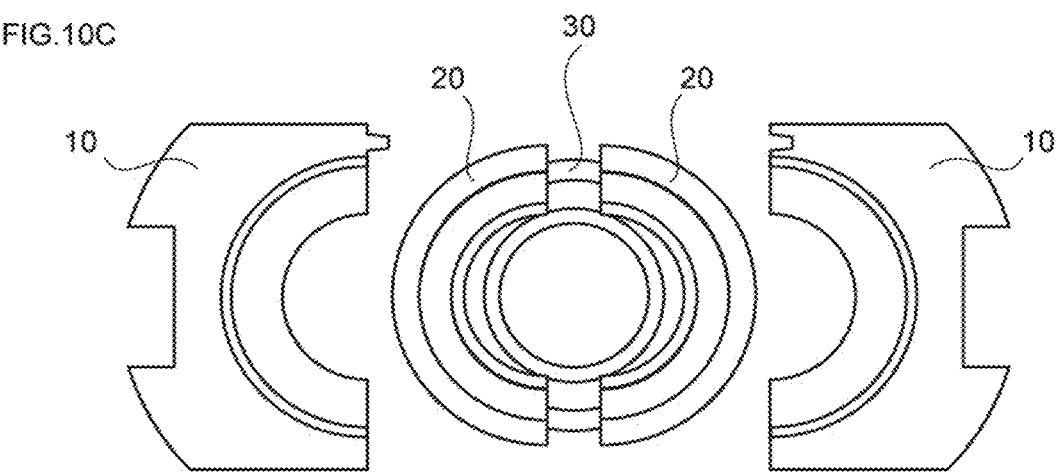

As illustrated in FIGS. 10(*a*) to 10(*c*), it is preferable that a molding mold 100 according to the invention is configured to include a molding mold base 10 and a neck ring mold 20, each being split into two; and a guide ring 30 that is accommodated inside the neck ring mold 20 so as to be capable of sliding along the contact surface with the neck ring mold 20 at the time of opening and closing of the neck ring mold 20.

FIG. 10(*a*) is a cross-sectional view obtainable in a case in which a molding mold 100 is cut at a plane that orthogonally intersects a bisecting cross-section for splitting the molding mold 100 into two and opening the molding mold, and the cut surface is viewed from the front.

Furthermore, FIG. 10(*b*) is a cross-sectional view illustrating a state in which the molding mold 100 shown in FIG. 10(*a*) is split into two and opened.

FIG. 10(*c*) is a plan view of the molding mold 100 in a state of being split into two and opened as illustrated in FIG. 10(*b*).

Hereinafter, the molding mold base 10, the neck ring mold 20, and the guide ring 30 will be each specifically explained.

(1)-1 Molding Mold Base

As illustrated in FIGS. 10(*a*) to 10(*c*), a molding mold base 10 according to the invention is a mold member for molding the body of a glass container.

Such a molding mold base 10 has a body molding unit 12 having a division line D for splitting the molding mold into two and opening the molding mold, and also comprising an inner peripheral surface for molding the outer peripheral shape of the body of the glass container.

Furthermore, above the body molding unit 12, there is an opening for introducing a gob, and such an opening is provided with a concavity for fitting a funnel or a baffle.

Below the body molding unit 12, there is also an opening for sandwiching the upper part of the neck ring mold from both sides and integrate it. The opening above the body molding unit 12, the body molding unit 12, and the opening below the body molding unit 12 are in communication.

The size or shape of the molding mold base may be appropriately selected according to the size or shape of the glass container to be produced.

Regarding the constituent material for the molding mold base, any conventionally known material may be used, and there are no particular limitations; however, for example, iron, an iron alloy, brass, or a copper-nickel alloy may be used.

(1)-2 Neck Ring Mold

As illustrated in FIGS. 10(*a*) to 10(*c*), a neck ring mold 20 according to the invention is a mold member for molding the appearance shape of the mouth of a glass container.

Such a neck ring mold 20 has a division line D for splitting the molding mold into two and opening the molding mold. The inner wall of the upper opening of the neck ring mold 20 is provided with a mouth molding unit 22 comprising an inner peripheral surface for molding the appearance shape of the mouth of a glass container. Such a mouth molding unit 22 is provided with grooves 22*a* for molding a thread in a case in which the mouth is configured to be screwed into a lid member.

Figure 11A:
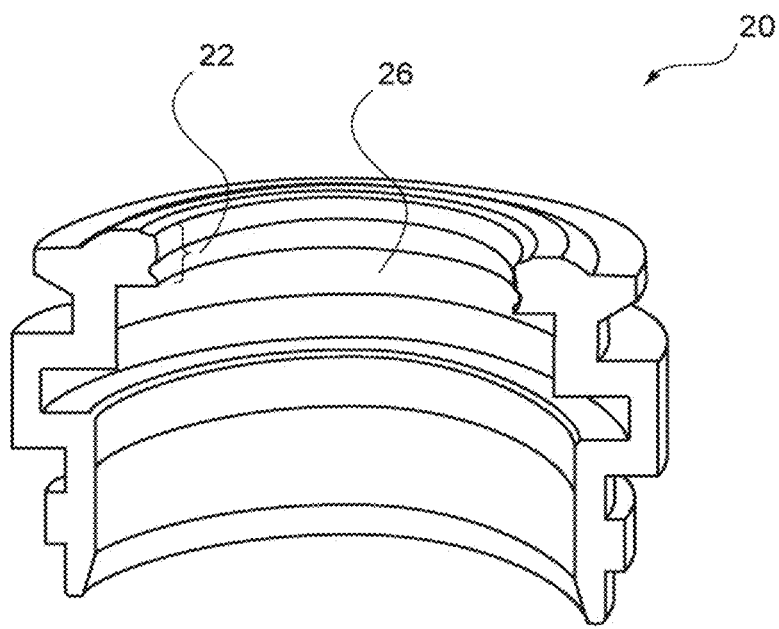
FIGS. 11(a) and 11(b) are diagrams provided to explain a neck ring mold.
Figure 11B:
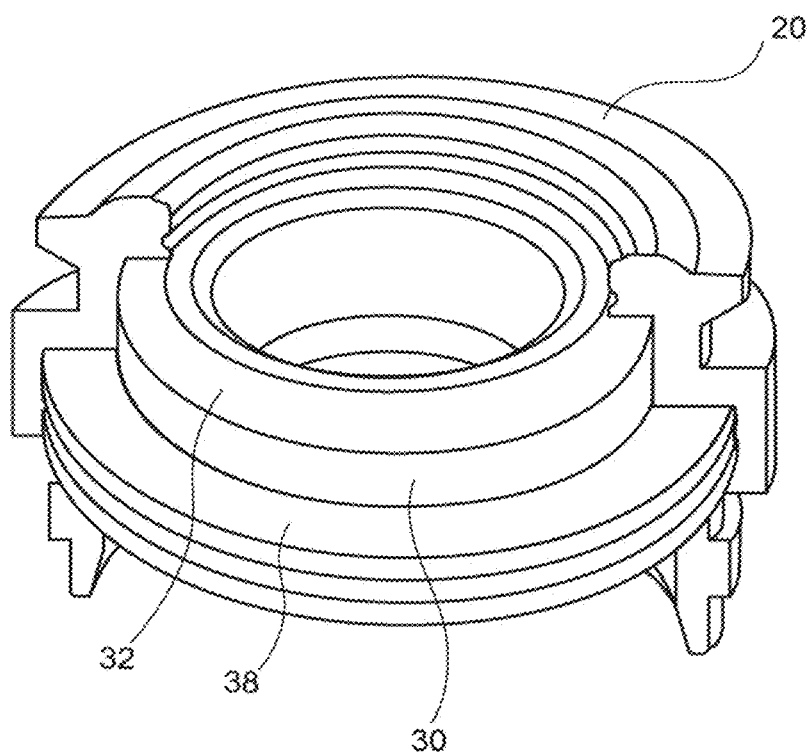

As illustrated in FIGS. 11(*a*) and 11(*b*), below the opening at the top plane of the neck ring mold 20, there is a guide ring accommodation unit 26 for accommodating a guide ring 30 so as to be capable of sliding along the contact surface with the neck ring mold 20 at the time of opening and closing of the neck ring mold 20.

Below the guide ring accommodation unit 26 of the neck ring mold 20, there is an opening that serves as an entrance at the time of inserting a plunger. The opening at the top plane of the neck ring mold, the guide ring accommodation unit 26, and the opening below the guide ring accommodation unit 26 are in communication.

As illustrated in FIGS. 10(*a*) to 10(*c*), the upper part of the outer peripheral surface of the neck ring mold 20 is provided with convex parts to be sandwiched and integrated from two sides by the molding mold base 10.

FIG. 11(*a*) is a perspective view illustrating one side of the neck ring mold 20 that has been split into two, as viewed from the inner peripheral surface side of the neck ring mold 20. FIG. 11(*b*) is a perspective view illustrating the state in which a guide ring 30 is accommodated in the guide ring accommodation unit 26 of the neck ring mold shown in FIG. 11(*a*).

Regarding the material for the neck ring mold, any conventionally known material may be used, and there are no particular limitations; however, for example, iron, an iron alloy, aluminum, or a copper-nickel alloy may be used, similarly to the constituent material for the molding mold base.

(1)-3 Guide Ring

As illustrated in FIGS. 10(*a*) to 10(*c*), it is preferable that the neck ring mold 20 according to the invention accommodates a guide ring 30 inside the mold.

Such a guide ring 30 is a mold member for forming an end surface of the rim at the mouth, and also functions as a guide member for enhancing the accuracy of movement of the plunger when the plunger is pressed against the gob.

Figure 12A:
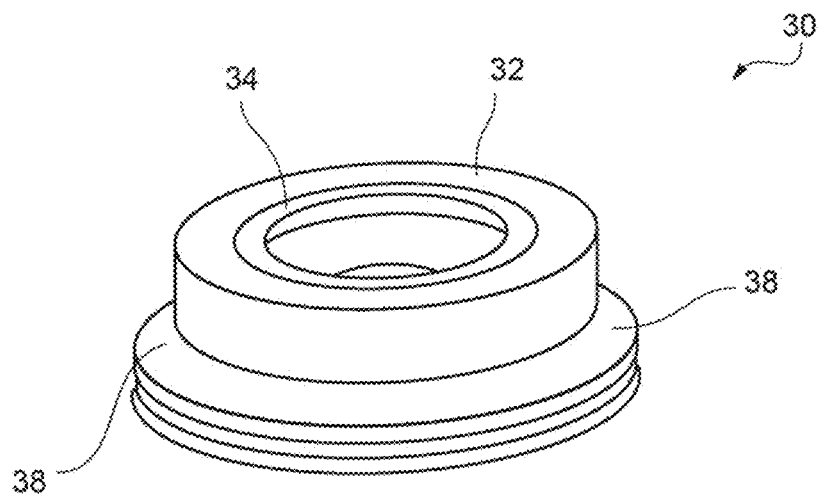
FIGS. 12(a) and 12(b) are diagrams provided to explain a guide ring.
Figure 12B:
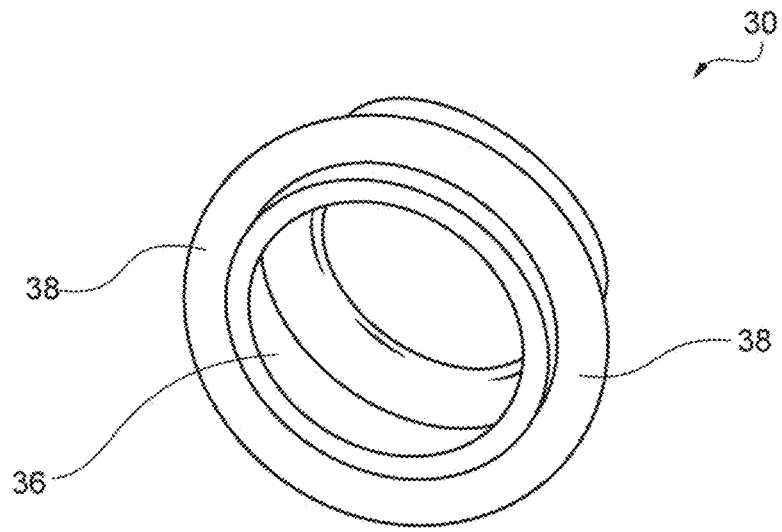

Furthermore, as illustrated in FIGS. 12(*a*) and 12(*b*), the guide ring 30 has an opening at the upper surface 32. The planar shape of such opening is coincident with the planar shape of the bottom of the molding surface section of the plunger.

Therefore, the guide ring can accurately guide the movement of the plunger in the stage in which the molding surface section of the plunger is to be completely inserted into the gob.

FIG. 12(*a*) is a perspective view of the guide ring 30, and FIG. 12(*b*) is a perspective view of the guide ring 30 as viewed from the lower surface side.

The guide ring 30 also has, in the upper part of the inner wall of the opening at the upper surface 32, an end surface molding unit 34 for molding the end surface portion section of the rim at the mouth of a glass container.

Below the opening at the upper surface 32, there is a pedestal accommodating unit 36 for accommodating the pedestal part of the plunger in the stage in which the molding surface section of the plunger is to be completely inserted into the gob.

As will be shown in Comparative Example 4 that will be described below, in a case in which multiple openings have been provided at the upper surface 32 respectively in accordance with the multiple convex surfaces formed at the molding surface section of the plunger, the end surface of the partition section of the glass container will be molded at the top plane of the guide ring 30.

Accordingly, in view of the structure of the guide ring 30, not only the formation of the rim becomes difficult per se, but also, distortion in the partition section occurs noticeably as a result of heating of the guide ring 30. Also, this distortion is likely to propagate throughout the entirety of the mouth.

Therefore, it is preferable that the number of openings at the upper surface 32 in the guide ring 30 is set to one.

Furthermore, as illustrated in FIG. 11(*b*), the guide ring 30 is accommodated inside the neck ring mold 20 so as to be capable of sliding along the contact surface with the neck ring mold 20 at the time of opening and closing of the neck ring mold 20.

More specifically, the guide ring 30 is accommodated such that the upper surface and the lower surface of an projection section 38 that is provided so as to protrude outward in the lower part of the upper surface 32 of the guide ring 30 and the outer peripheral surface of the guide ring 30, can respectively slide along the corresponding contact surfaces at the inner wall of the guide ring accommodation unit 26 in the neck ring mold 20.

Figure 13A:
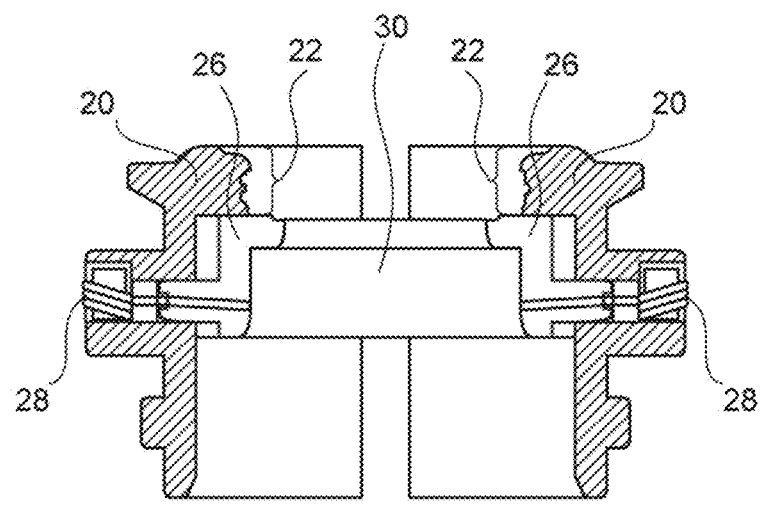
FIGS. 13(a) and 13(b) are diagrams provided to explain the accommodation form of a guide ring with respect to a neck ring mold.
Figure 13B:
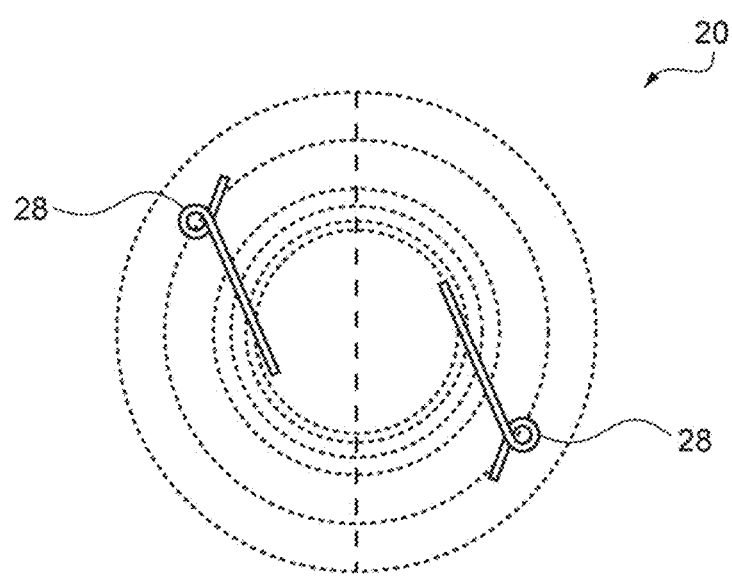

Furthermore, as illustrated in FIGS. 13(*a*) and 13(*b*), it is preferable that the guide ring 30 is accommodated inside the neck ring mold 20 by being urged by spring members 28.

In Step (E) as illustrated in FIG. 8(*b*), it is preferable that, while the neck ring mold 20 is split into two and is opened, the position of dropping of the glass container 200' having a finished shape is centered by the guide ring 30, and the glass container 200' having a finished shape is dropped by its own weight, so as to be placed on the bottom mold 82 of a cooling mold 80.

The reason for this is that the glass container 200' having a finished shape obtained in Step (C) can be stably transferred into the cooling mold 80.

Here, as illustrated in FIG. 12(*a*), in the upper part of the inner wall of the opening at the upper surface 32 in the guide ring 30 (this is rotated 180° together with the neck ring mold 20 by an arm at the time of being transferred into the cooling mold 80, and becomes the "lower part of the inner wall of the opening at the lower surface"), an end surface molding unit 34 for molding the end surface portion of the rim at the mouth of the glass container is provided. Therefore, the guide ring 30 and the glass container 200' having a finished shape are fitted into each other to a slight extent.

Therefore, when the guide ring 30 is centered by the spring members 28, the glass container 200' having a finished shape is also centered at the same time.

FIG. 13(*a*) is a cross-sectional view in the case in which the neck ring mold 20 accommodating the guide ring 30 is cut in a vertical direction, and FIG. 13(*b*) is a plan view of the neck ring mold 20.

Regarding the constituent material for the guide ring, any conventionally known material may be used, and there are no particular limitations; however, for example, iron, an iron alloy, brass, or a copper-nickel alloy may be used, similarly to the constituent material for the molding mold base.

(2) Plunger

As illustrated in FIGS. 14(*a*) and 14(*b*), a plunger 50 according to the invention is a member that is to be inserted into the molding mold from the lower part of the molding mold so as to mold the inner peripheral surface of the mouth for a glass container, that is, the inner peripheral surface of the rim and multiple concavities.

Such a plunger 50 comprises a molding surface section 52, which is a part that directly molds the inner peripheral surface of the mouth; and a pedestal section 54 that serves as a base for the molding surface section 52.

Furthermore, the molding surface section 52 has multiple convex surfaces 52c. The number of multiple convex surfaces 52c, the closest distance between the multiple adjoining convex surfaces 52c, the proportion of the total surface area of the multiple convex surfaces 52c with respect to the surface area of the molding surface section 52 in FIG. 14(a), and the planar shape and the cross-sectional shape of the convex surfaces 52c are equivalent to the matters related to the multiple concavities in the glass container.

Figure 14A:
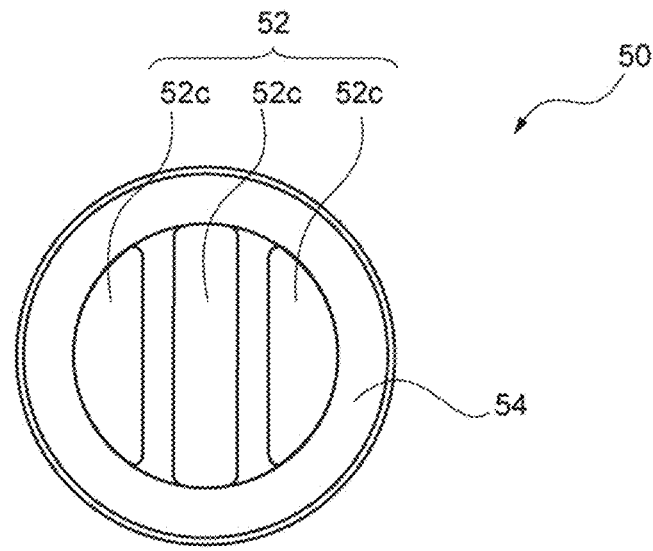
FIGS. 14(a) and 14(b) are diagrams provided to explain a plunger.
Figure 14B:
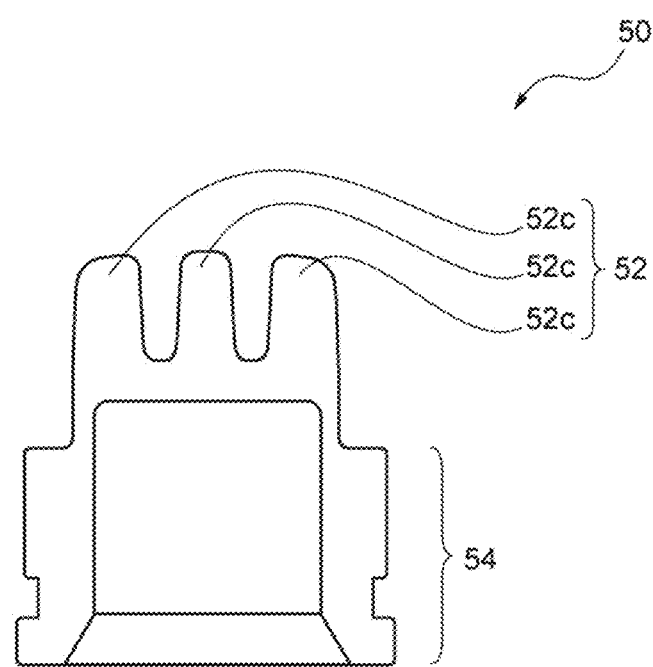

The plunger 50 illustrated in FIGS. 14(a) and 14(b) is a plunger 50 for producing the glass container 200 illustrated in FIGS. 1(a) and 1(b).

Figure 15A:
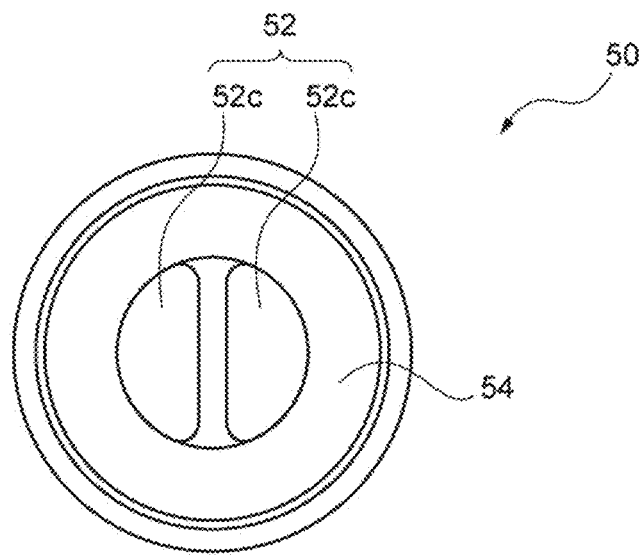
FIGS. 15(a) and 15(b) are other diagrams provided to explain a plunger.
Figure 15B:
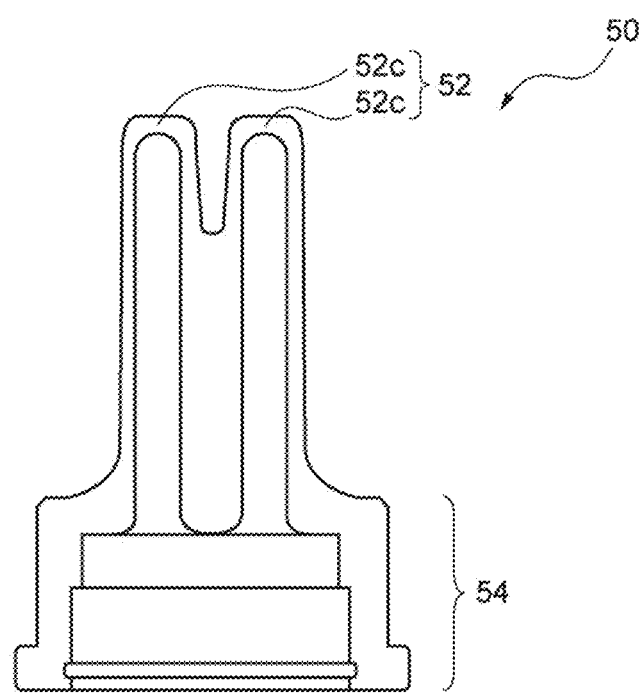
Figure 16A:
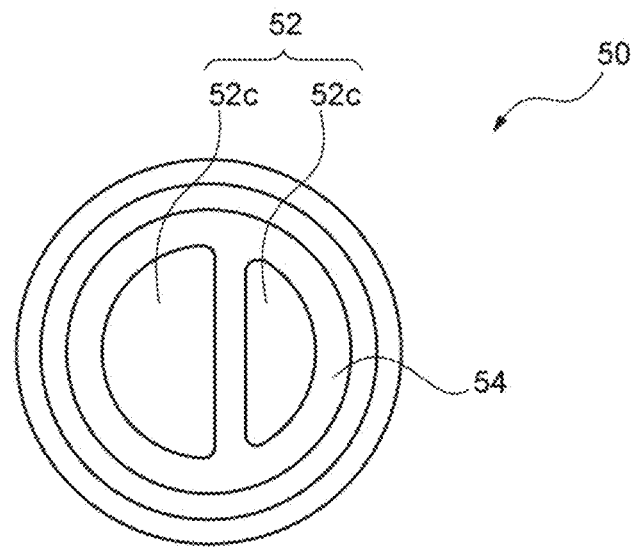
FIGS. 16(a) and 16(b) are still other diagrams provided to explain a plunger.
Figure 16B:
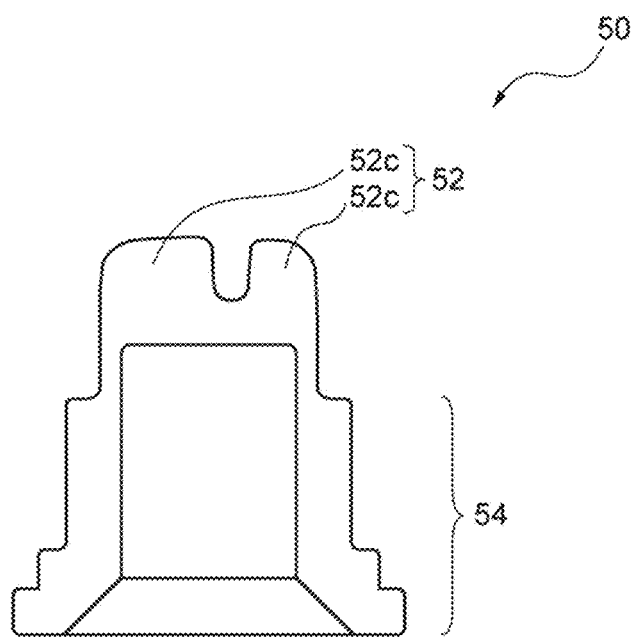
Figure 17A:
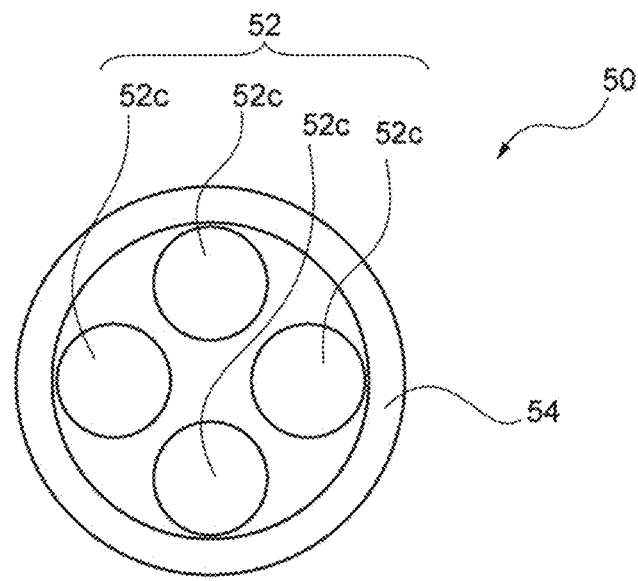
FIGS. 17(a) and 17(b) are still other diagrams provided to explain a plunger.
Figure 17B:
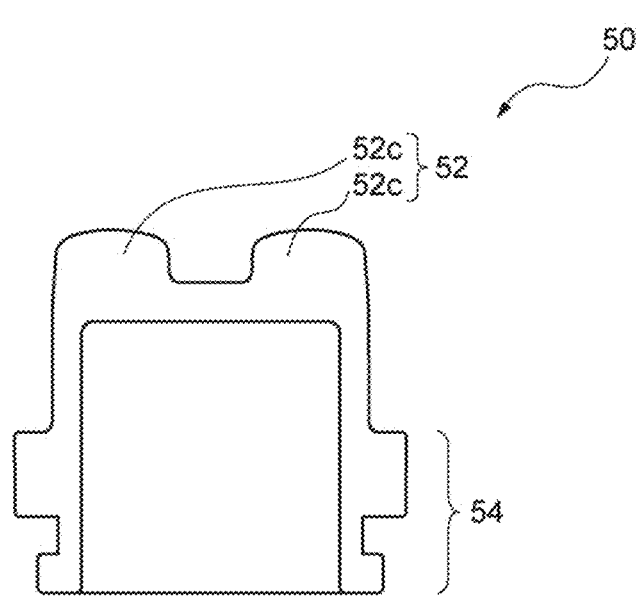

Other examples of plungers 50 are shown in FIGS. 15 to 17. They are plungers for respectively producing the glass containers 200 illustrated in FIGS. 3 to 5.

FIG. 14(a) is a plan view of the plunger 50, and FIG. 14(b) is a lateral cross-sectional view of the plunger 50. The same descriptions also apply to FIGS. 15 to 17.

Figure 18A:
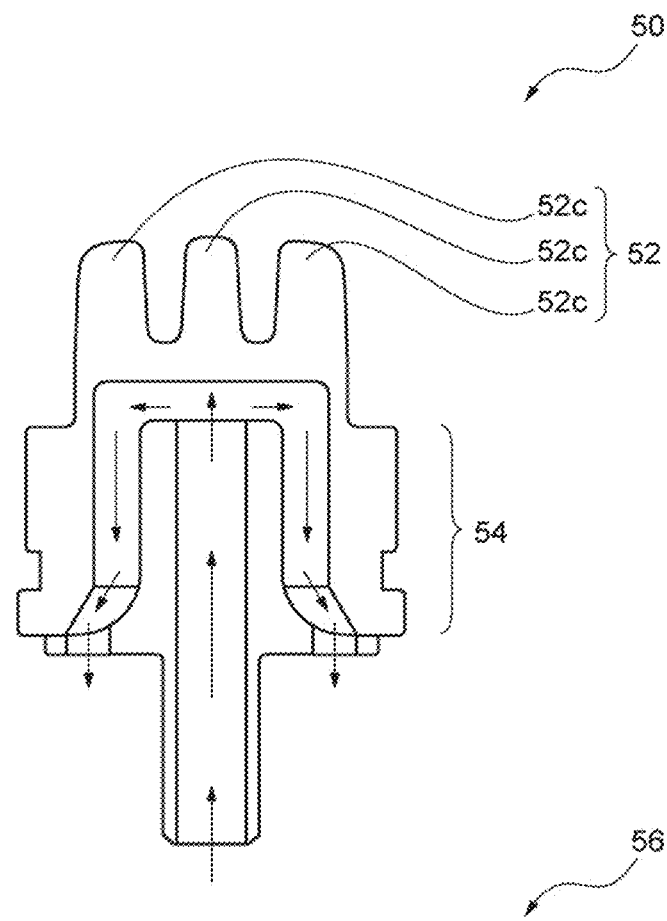
FIGS. 18(a) and 18(b) are diagrams provided to explain an internal cooling device of a plunger.
Figure 18B:
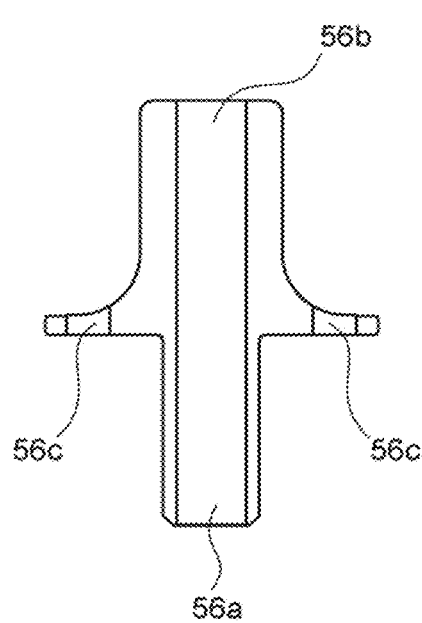

Furthermore, it is preferable that a cylindrical internal cooling device 56 as illustrated in FIG. 18(b), having a cooling air supply inlet 56a, a cooling air supply outlet 56b, and a cooling air discharge port 56c, is accommodated inside the plunger 50 as illustrated in FIG. 18(a).

The reason for this is that when such an internal cooling device 56 is used, the temperature of the molding surface section 52 can be regulated with good control by efficiently blowing a cooling air flow toward the inner peripheral surface of the molding surface section 52.

That is, it is because when such an internal cooling device 56 is used, a cooling air flow can be blown through the cooling air supply outlet 56b to the inner peripheral surface of the molding surface section 52 as illustrated in FIG. 18(a), while the once-blown air can be discharged to the outside through the cooling air discharge port 56c provided downstream, without inhibiting the progress of the cooling air flow that is newly supplied through the cooling air supply inlet 56a.

Also, there are no particular limitations on the material for the internal cooling device 56; however, it is preferable to use stainless steel, an aluminum alloy or the like.

FIG. 18(a) is a cross-sectional view of the plunger 50 in a state of accommodating an internal cooling device 56, and FIG. 18(b) is a cross-sectional view of the internal cooling device 56.

Figure 19A:
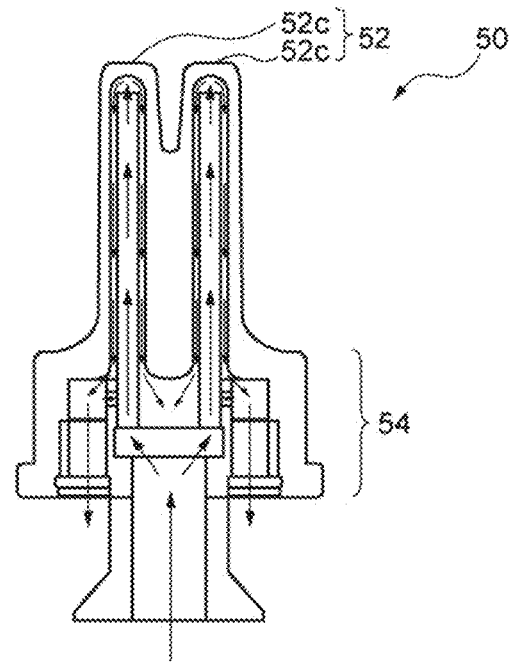
FIGS. 19(a) to 19(c) are other diagrams provided to explain an internal cooling device of a plunger.

In the plunger 50 illustrated in FIG. 19(a), unlike the case illustrated in FIG. 18(a), the inner peripheral surface of the molding surface section 52 has a shape following the respective shapes of the multiple convex surfaces 52c, and the thickness of the molding surface section 52 becomes thin.

Figure 19B:
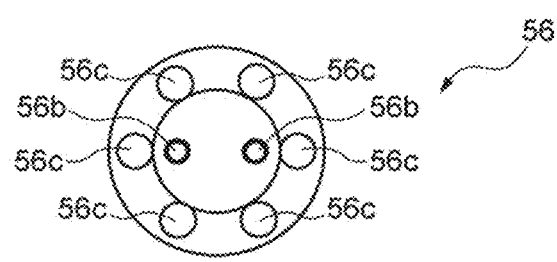
Figure 19C:
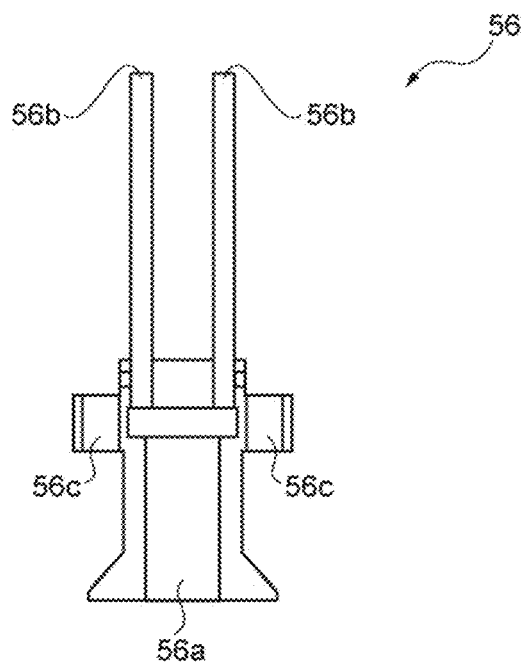

Also, in the internal cooling device 56 illustrated in FIGS. 19(b) and 19(c), cooling air supply outlets 56b are installed at each convex surface 52c.

Therefore, the temperature of the molding surface section 52 can be controlled more efficiently with the internal cooling device 56 and the plunger 50 as illustrated in FIGS. 19(a) to 19(c) than with the internal cooling device 56 and the plunger 50 illustrated in FIGS. 18(a) and 18(b).

FIG. 19(a) is a cross-sectional view of the plunger 50 in a state of having the internal cooling device 56 accommodated therein, FIG. 19(b) is a plan view of the internal cooling device 56, and FIG. 19(c) is a cross-sectional view of the internal cooling device 56.

There are no particular limitations concerning the size of the plunger since it may vary widely depending on the size of the glass container to be produced; however, it is usually preferable to adjust the maximum diameter of the molding surface section of the plunger to a value within the range of 10 to 50 mm, and it is preferable to adjust the length of the molding surface section of the plunger to a value within the range of 10 to 50 mm.

Regarding the constituent material for the plunger, any conventional known material may be used, and there are no particular limitations; however, for example, iron, an iron alloy, brass, or a copper-nickel alloy may be used, similarly to the constituent material for the molding mold base.

(3) Funnel

As illustrated in FIG. 6(a), a funnel 72 according to the invention is a member that is to be fitted into the opening in the upper part of the molding mold base 10 to thereby allow the gob 70 to be introduced stably into the interior of the molding mold 100.

Such a funnel has a cylindrical shape with its two ends being open, and it is preferable to make the area of the opening at the upper end larger than the opening at the lower end.

Regarding the constituent material for the funnel, iron, an iron alloy, brass, a copper-nickel alloy, or the like may be used, similarly to the constituent material for the molding mold base.

(4) Baffle

A baffle 60 according to the invention as illustrated in FIGS. 6(b) to 7(b) is a member that is to be fitted into the opening in the upper part of the molding mold base 10 and blocks this opening. It is a member for molding the bottom of the glass container 200' having a finished shape.

That is, the convex part 61 at the bottom surface of the baffle 60 molds the bottom of the glass container 200' having a finished shape.

Also, regarding the constituent material for the baffle 60, iron, an iron alloy, brass, a copper-nickel alloy, or the like may be used, similarly to the constituent material for the molding mold base 10.

(5) Blow Head

Figure 8C:
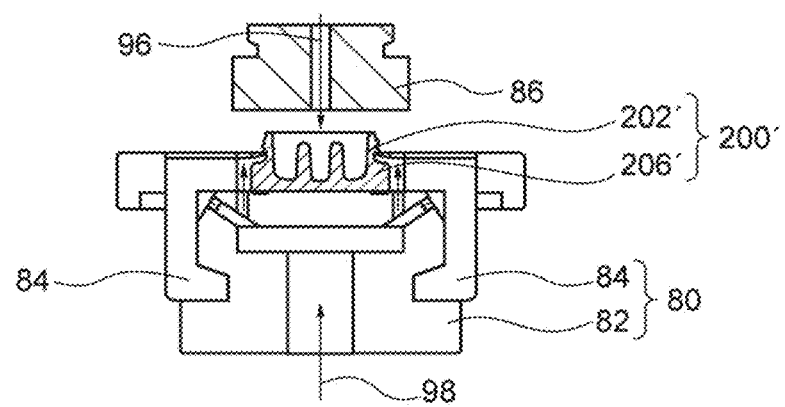
Figure 20:
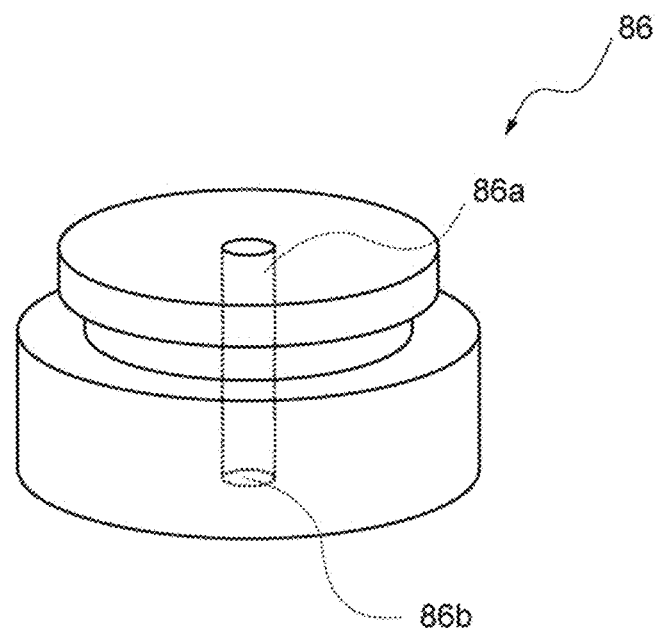
FIG. 20 is a diagram provided to explain a blow head.

A blow head 86 as illustrated in FIG. 20 is a member for efficiently blowing a first cooling air flow 96 toward the interior of the glass container 200' having a finished shape, which is accommodated at a predetermined position inside the cooling mold 80 that will be described below, as illustrated in FIG. 8(c).

Such a blow head 86 includes, as illustrated in FIG. 20, a blowing hole 86a that blows the first cooling air flow 96, and a supply outlet (first supply outlet) 86b that is intended to blow the first cooling air flow 96 toward the interior of the glass container 200' having a finished shape. As illustrated in FIG. 8(c), the blow head 86 is disposed to be separated from the mouth of the glass container 200' having a finished shape.

Thereby, the first cooling air flow 96 blown through the blowing hole 86a can be supplied to the interior of the glass container 200' having a finished shape through the first supply outlet 86b. The blown first cooling air flow 96 can be efficiently discharged through the gap provided between the blow head 86 and the mouth of the glass container 200' having a finished shape.

Accordingly, the glass container 200' having a finished shape can be efficiently cooled from the inner surface side thereof, without being swollen by blown air as in the case of blow-and-blow molding or press-and-blow molding.

Furthermore, when a blow head 86 disposed as such is employed, since there is no need to provide a discharge hole for the first cooling air flow 96, machining of the interior of the blow head can be simplified.

The blow head 86 can also be made using an iron alloy, brass, a copper-nickel alloy or the like, similarly to the molding mold and the like described above.

FIG. 20 is a perspective view of the blow head 86.

(6) Cooling Mold

Figure 21:
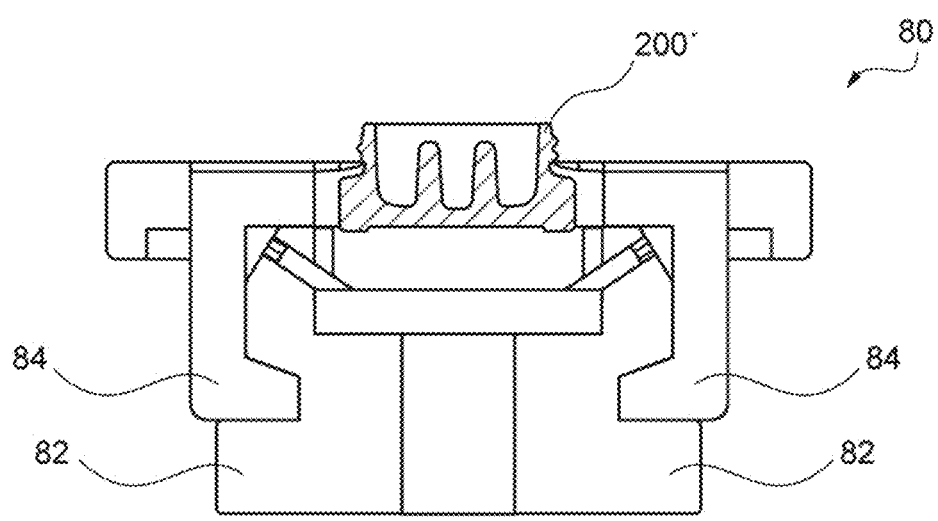
FIG. 21 is a diagram provided to explain a cooling mold.

The cooling mold 80 illustrated in FIG. 21 is a mold used for retaining the glass container 200' having a finished shape and cooling it.

Such a cooling mold 80 includes, as illustrated in FIG. 21, a finishing mold 84 for surrounding the lateral peripheral surface of the glass container 200' having a finished shape, and a bottom mold 82 on which the bottom of the glass container 200' having a finished shape is placed.

Unlike the molding mold 100, since the cooling mold 80 is intended to only cool the glass container 200' having a finished shape, and is not brought into direct contact with the glass container 200' having a finished shape at the lateral side, the cooling mold 80 is usually formed from a cast metal, an iron alloy, brass or the like. The shape of the cooling mold 80 can also be appropriately modified according to the external shape of the glass container to be produced.

FIG. 21 is a cross-sectional view in the case in which the cooling mold 80 is cut in a vertical direction.

Furthermore, a bottom mold 82 is a member on which the bottom of the glass container 200' having a finished shape is placed.

Figure 22A:
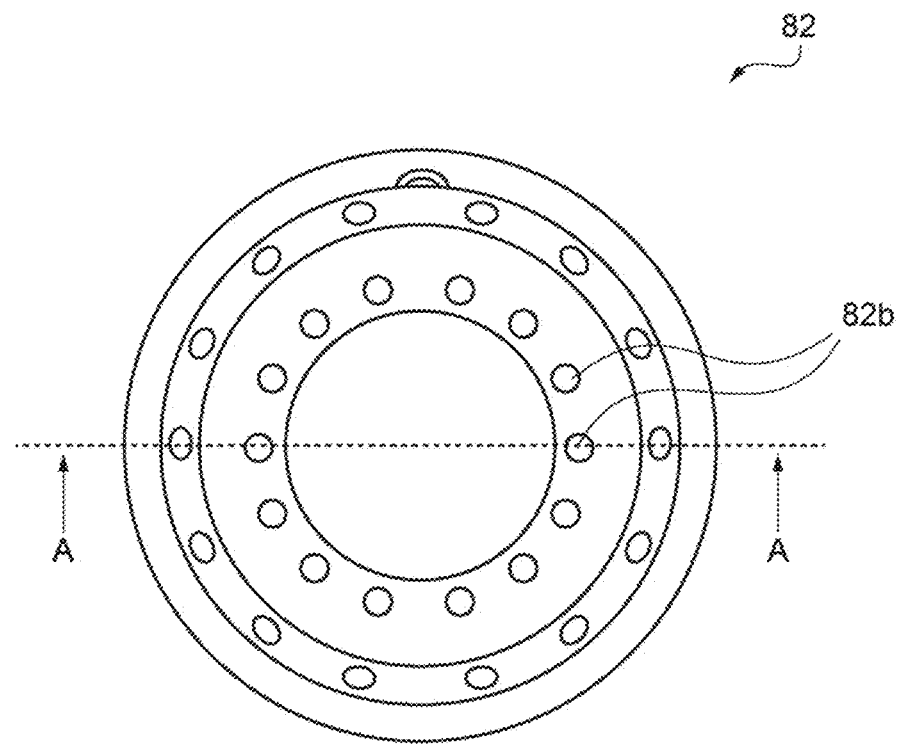
FIGS. 22(a) and 22(b) are diagrams provided to explain a bottom mold that is a part of a cooling mold.
Figure 22B:
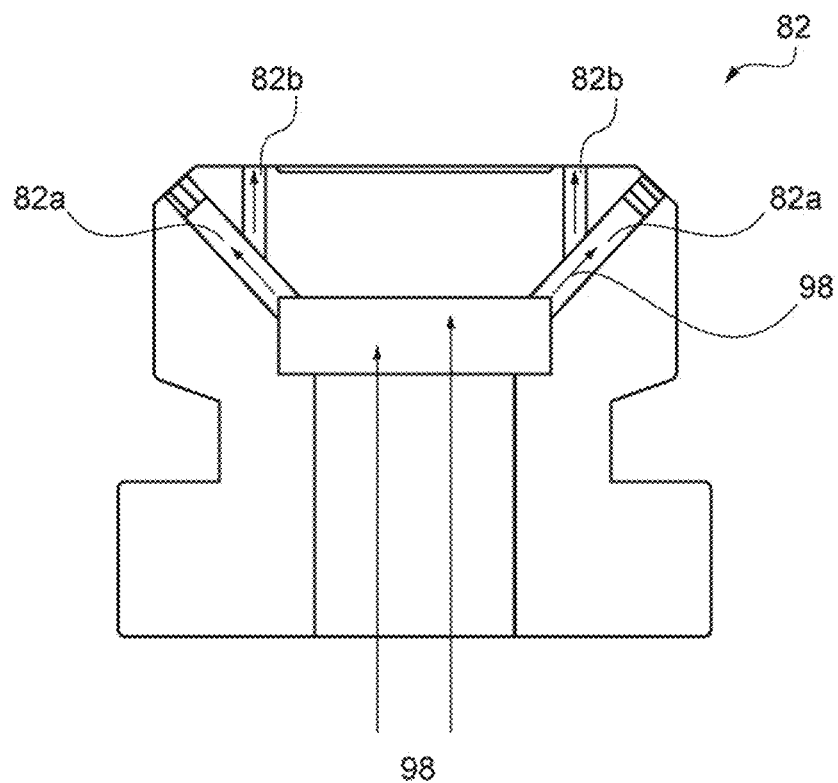

Such a bottom mold 82 includes, as illustrated in FIGS. 22(*a*) and 22(*b*), a blow hole 82*a* that blows a second cooling air flow 98, and a second supply outlet 82*b* for blowing the second cooling air flow 98 from the lower side of the glass container 200' having a finished shape, so that the second cooling air flow 98 can pass in through the gap provided between the outer peripheral surface of the glass container 200' having a finished shape and the finishing mold.

Meanwhile, FIG. 22(*a*) is a plan view of the bottom mold 82, and FIG. 22(*b*) is a cross-sectional view in the case in which the bottom mold 82 illustrated in FIG. 22(*a*) is cut in the vertical direction along the dotted line A-A, and the cut surface is viewed from the direction indicated by the arrows.

When the cooling mold 80 including the finishing mold 84 and the bottom mold 82 as such is used, the second cooling air flow 98 can be blown in a predetermined direction (vertical direction) through the second supply outlet 82*b* on the lower side of the glass container 200' having a finished shape. Therefore, it can prevent the second cooling air flow 98 from being blown directly to the glass container 200' having a finished shape.

Therefore, deformation of the glass container 200' having a finished shape caused by the blow pressure or the like of the second cooling air flow 98 can be effectively prevented.

Also, when the second cooling air flow 98 blown through the second supply outlet 82*b* is passed in through the gap between the glass container 200' having a finished shape and the finishing mold 84, cooling by the second cooling air flow 98 together with the first cooling air flow 96 can be achieved efficiently and uniformly from the inner peripheral surface and the outer peripheral surface of the glass container 200' having a finished shape.

Furthermore, since unnecessary surface unevenness being formed on the surface of the glass container 200 thus obtainable can be avoided irrespective of the surface state or the temperature state of the inner peripheral surface of the finishing mold 84, the product quality of the glass container 200 thus obtainable can be enhanced.

EXAMPLES

The method for producing a glass container of the invention will be explained in more detail by way of Examples.

Example 1

Production of Glass Container (1) Step (A)

A funnel was fitted into a molding mold as illustrated in FIG. 6(*a*), and then 78 g of a gob of soda lime glass was introduced into the molding mold through the funnel.

At this time, the temperature of the gob was adjusted to 1095° C.

The temperature of the gob was adjusted by regulating the burner inside a forehearth.

(2) Step (B)

Next, the funnel was removed from the molding mold, and then a baffle was fitted into the molding mold, as illustrated in FIG. 6(*b*).

(3) Step (C)

Next, as illustrated in FIG. 7(*a*), the temperature of the molding surface section in a plunger as illustrated in FIG. 14, which has three convex surfaces in the molding surface section, was adjusted to 350° C. using an internal cooling device as illustrated in FIG. 18(*a*). Subsequently, the plunger was inserted into the molding mold from the side opposite to the side where the baffle was fitted, and the gob was pressed for 1.4 seconds. Thereby, a glass container having a finished shape was molded from the gob.

In the internal cooling device, an air flow at room temperature was supplied for 1.4 seconds at a pressure of 0.2 MPa.

(4) Step (D)

Next, the plunger was pulled out from the glass container having a finished shape, as illustrated in FIG. 7(*b*).

(5) Step (E)

Next, the glass container having a finished shape was transferred into a cooling mold and cooled, as illustrated in FIG. 8. Thus, a glass container as illustrated in FIG. 1 was obtained.

2. Evaluation (1) Distortion in Partition Section

Distortion in the partition section of the glass container thus obtained was evaluated.

That is, 20,000 glass containers were manufactured under the same conditions, and the distortion in the partition section was evaluated according to the following criteria, by calculating the yield of products that were acceptable by subjective visual inspection of the appearance. The results thus obtained are presented in Table 1.

Very good: the product yield value with respect to distortion in the partition section is 99% or higher.

Good: the product yield value with respect to distortion in the partition section is within the range of from 90% to below 99%.

Fair: the product yield value with respect to distortion in the partition section is within the range of from 80% to below 89%.

Bad: the product yield value with respect to distortion in the partition section is below 80%.

(2) Defects in Rim and Partition Section

The defects in the rim and the partition section of the glass container thus obtained were evaluated.

That is, products that were acceptable in view of distortion in the partition section were selected from among the 20,000 glass containers mentioned above, and for these acceptable products, defects in the rim and the partition section were evaluated according to the following criteria, by calculating the yield of products that were acceptable by subjective visual inspection of the appearance. The results thus obtained are presented in Table 1.

In regard to the following criteria, the "product yield with respect to defects in the rim and the partition section" means the product yield of glass containers having no defects in the rim as well as the partition section.

Very good: the product yield value with respect to defects in the rim and the partition section is 99% or higher.

Good: the product yield value with respect to defects in the rim and the partition section is within the range of from 90% to below 99%.

Fair: the product yield value with respect to defects in the rim and the partition section is within the range of from 80% to below 89%.

Bad: The product yield value with respect to defects in the rim and the partition section is below 80%.

Example 2

In Example 2, a glass container as illustrated in FIG. 3 was produced in the same manner as in Example 1, except that a plunger having two convex surfaces in the molding surface section as illustrated in FIG. 15, and the internal cooling device described in FIGS. 19(a) and 19(b) were used; the molding mold was replaced with a molding mold suitable for the changed plunger; 30 g of a gob at 1120° C. was introduced in Step (A); and the temperature of the molding surface section of the plunger was adjusted to 325° C. in Step (C). The glass container was evaluated and the results thus obtained are presented in Table 1.

Example 3

In Example 3, a glass container as illustrated in FIG. 4 was produced in the same manner as in Example 1, except that a plunger having two unequal convex surfaces in the molding surface section as illustrated in FIG. 16, and an internal cooling device that is not shown in the diagram were used; the molding mold was replaced with a molding mold suitable for the changed plunger; 45 g of a gob at 1095° C. was introduced in Step (A); and the temperature of the molding surface section of the plunger was adjusted to 323° C. in Step (C). The glass container was evaluated and the results thus obtained are presented in Table 1.

Example 4

Figure 23A:
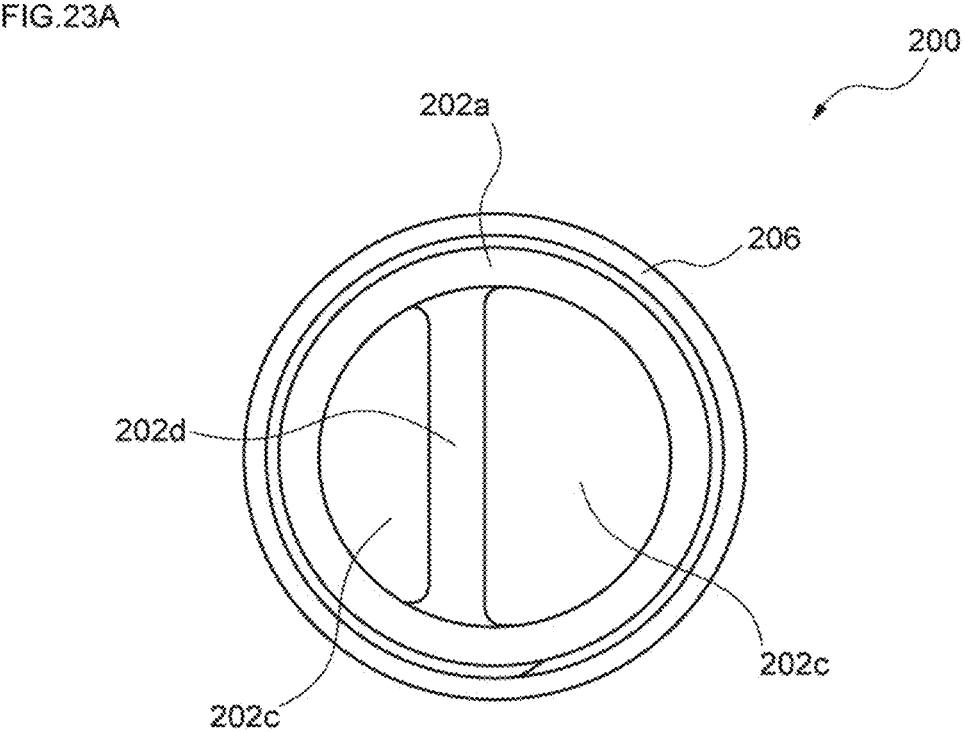
FIGS. 23(a) and 23(b) are diagrams provided to illustrate the glass container of Example 4.
Figure 23B:
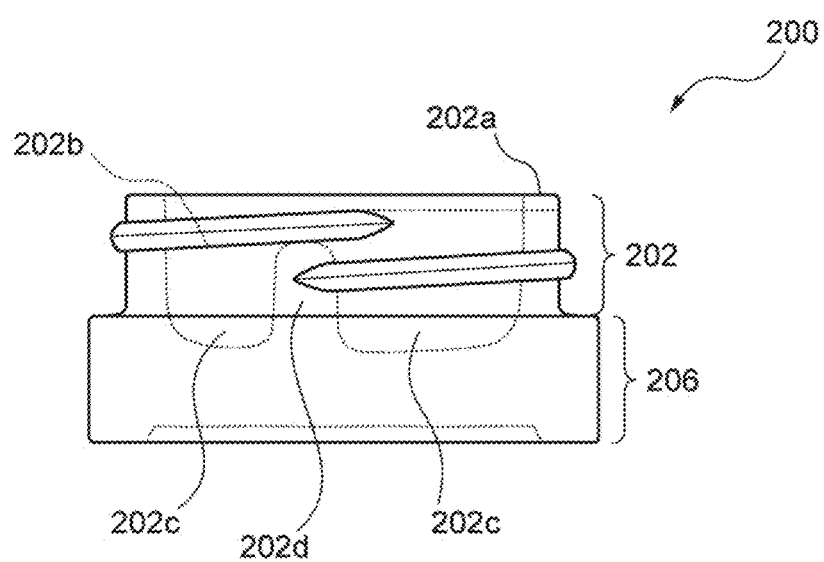

In Example 4, a glass container as illustrated in FIG. 23 was produced in the same manner as in Example 1, except that a plunger having two unequal convex surfaces in the molding surface section that is not shown in the diagram, and an internal cooling device that is not shown in the diagram were used; the molding mold was replaced with a molding mold suitable for the changed plunger; 39 g of a gob at 1100° C. was introduced in Step (A); and the temperature of the molding surface section of the plunger was adjusted to 330° C. in Step (C). The glass container was evaluated and the results thus obtained are presented in Table 1.

Example 5

In Example 5, a glass container as illustrated in FIG. 5 was produced in the same manner as in Example 1, except that a plunger having four convex surfaces in the molding surface section as illustrated in FIG. 17, and an internal cooling device that is not shown in the diagram were used; the molding mold was replaced with a molding mold suitable for the changed plunger; 160 g of a gob at 1100° C. was introduced in Step (A); and the temperature of the molding surface section of the plunger was adjusted to 293° C. in Step (C). The glass container was evaluated and the results thus obtained are presented in Table 1.

Comparative Example 1

In Comparative Example 1, a glass container was produced in the same manner as in Example 1, except that the temperature of the gob was adjusted to 1085° C. in Step (A); and the temperature of the molding surface section of the plunger was adjusted to 535° C. in Step (C). The glass container was evaluated and the results thus obtained are presented in Table 1. A perspective view and photographs of the glass container thus obtained are presented in FIGS. 24(a) to 24(c).

Figure 24A:
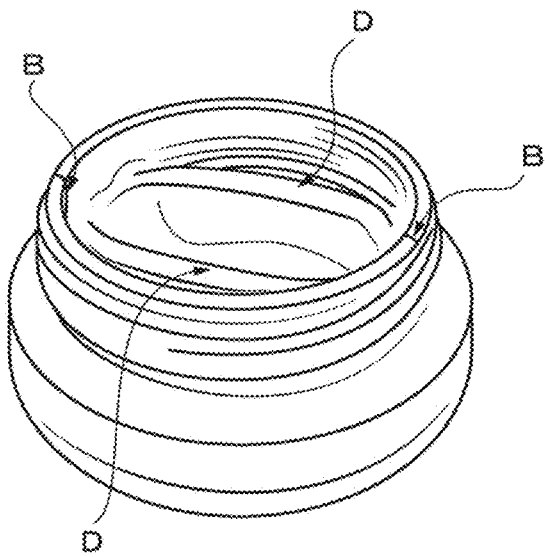
FIGS. 24(a) to 24(c) are diagrams provided to illustrate the glass container of Comparative Example 1.
Figure 24B:
Figure 24C:
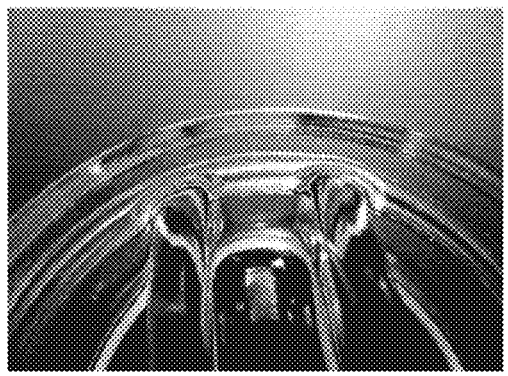

As shown in FIGS. 24(a) to 24(c), it was confirmed that distortion D occurred on the respective outer sides of the two partition sections, and also, defects B occurred at the site interposed between the two partition sections in the rim.

Comparative Example 2

In Comparative Example 2, a glass container was produced in the same manner as in Example 3, except that the temperature of the gob was adjusted to 1095° C. in Step (A); and the temperature of the molding surface section of the plunger was adjusted to 386° C. in Step (C). The glass container was evaluated and the results thus obtained are presented in Table 1. A perspective view and a photograph of the glass container thus obtained are presented in FIGS. 25(a) and 25(b).

Figure 25A:
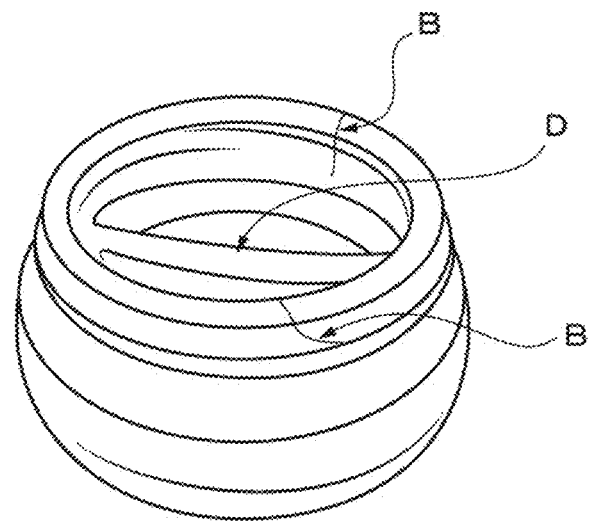
FIGS. 25(a) and 25(b) are diagrams provided to illustrate the glass container of Comparative Example 2.
Figure 25B:

As shown in FIGS. 25(a) and 25(b), it was confirmed that distortion D occurred, as the center portion of the partition section subsided down, and also, defects B also occurred in the rim.

Comparative Example 3

In Comparative Example 3, a glass container was produced in the same manner as in Example 5, except that the temperature of the gob was adjusted to 1070° C. in Step (A); and the temperature of the molding surface section of the plunger was adjusted to 380° C. in Step (C). The glass container was evaluated and the results thus obtained are presented in Table 1. A perspective view and a photograph of the glass container thus obtained are presented in FIGS. 26(a) and 26(b).

Figure 26A:
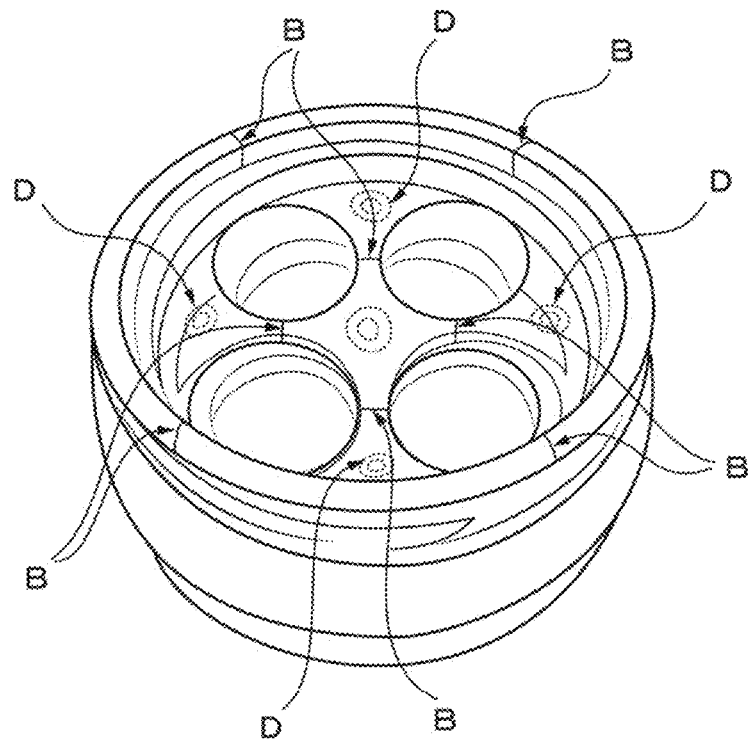
FIGS. 26(a) and 26(b) are diagrams provided to illustrate the glass container of Comparative Example 3.
Figure 26B:
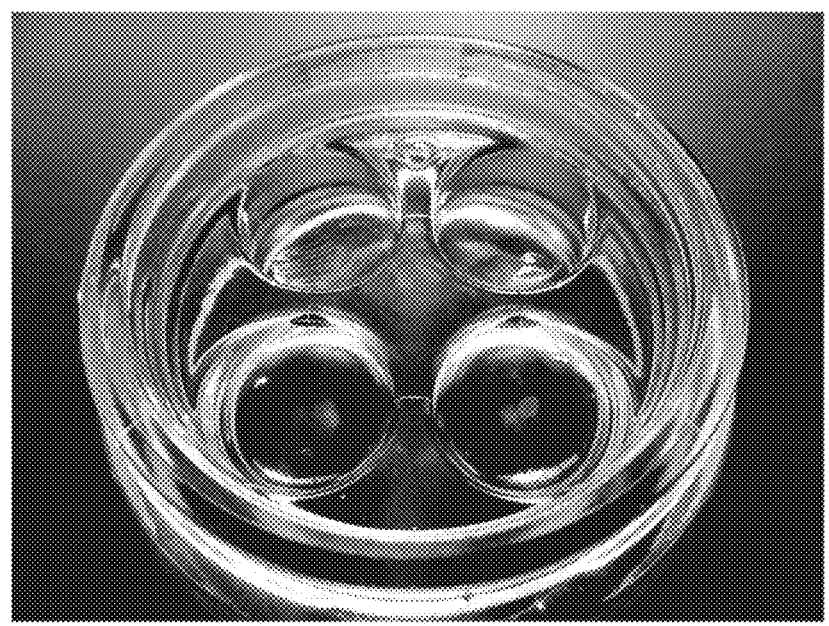

As shown in FIGS. 26(a) and 26(b), it was confirmed that ripple-like distortion D occurred in the planar portion of the partition section, and also, defects B occurred regularly in the rim and the partition section.

Comparative Example 4

In Comparative Example 4, a glass container was produced in the same manner as in Example 1, except that a plunger having two convex surfaces in the molding surface section, which is not shown in the diagram, and an internal cooling device that is not shown in the diagram were used; the molding mold was replaced with a predetermined molding mold; and the amount of the gob was changed to 166 g. The glass container was evaluated and the results thus obtained are presented in Table 1. A perspective view and a photograph of the glass container thus obtained are presented in FIGS. 27(a) and 27(b).

Figure 27A:
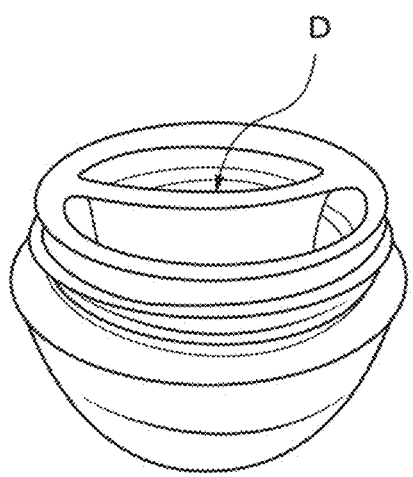
FIGS. 27(a) and 27(b) are diagrams provided to illustrate the glass container of Comparative Example 4.
Figure 27B:
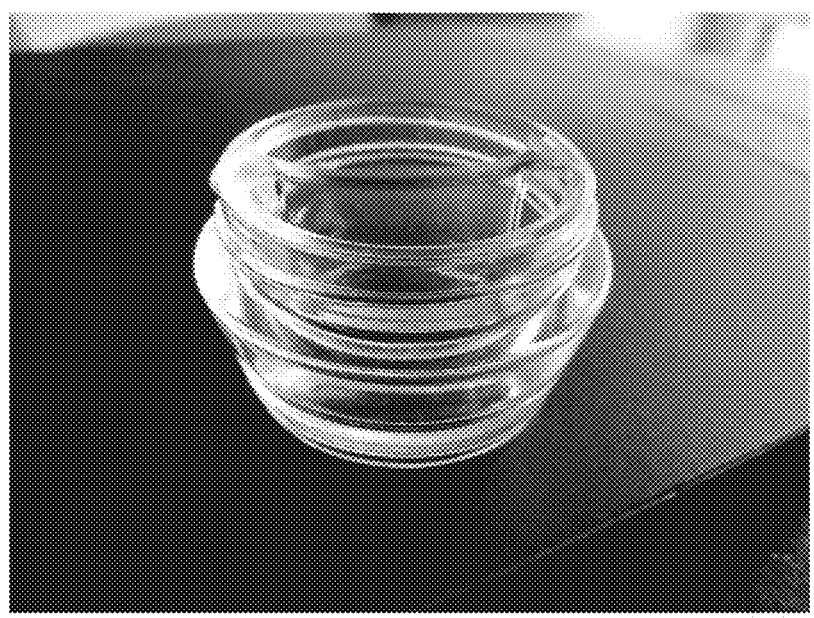

As shown in FIGS. 27(a) and 27(b), it was confirmed that distortion D occurred, as the center portion of the partition section subsided down.

Figure 28:
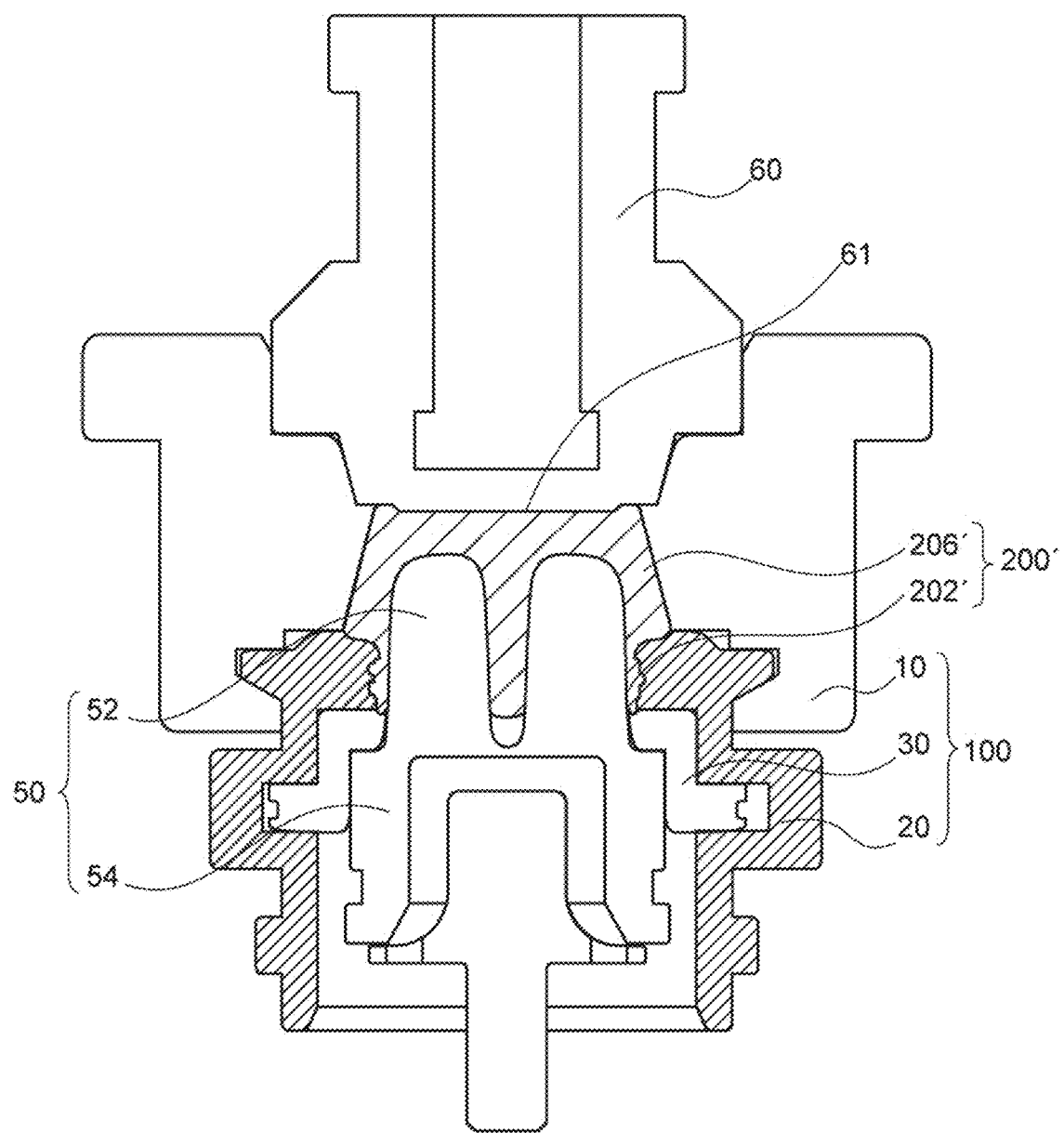
FIG. 28 is a diagram provided to explain an embodiment of Step (C) with regard to Comparative Example 4.

An embodiment of Step (C) for Comparative Example 4 is illustrated in FIG. 28.

Figure 29A:
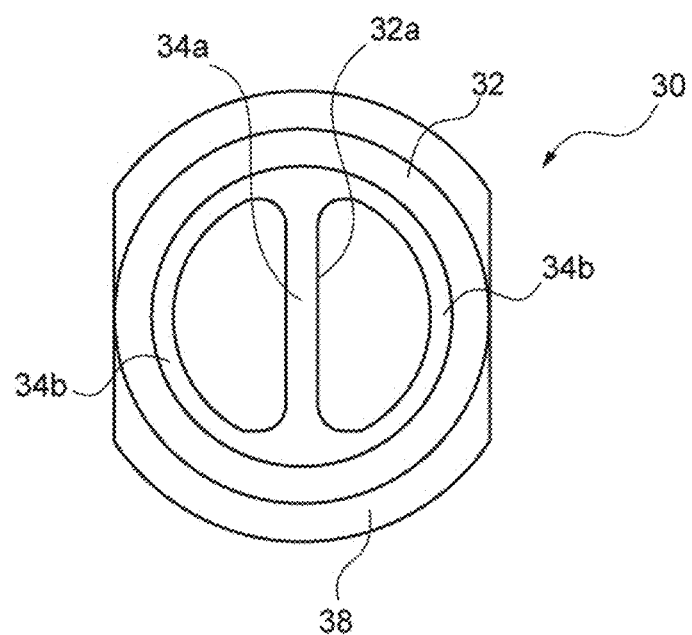
FIGS. 29(a) and 29(b) are diagrams provided to explain a guide ring with regard to Comparative Example 4.
Figure 29B:
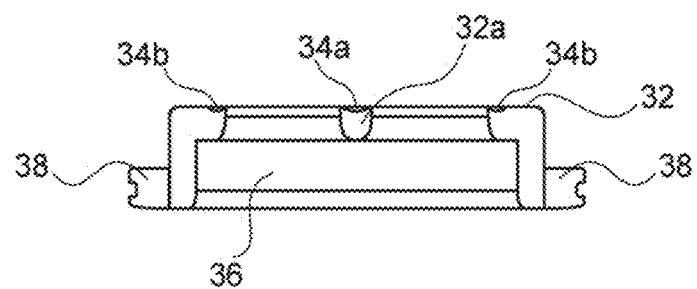
Figure 30A:
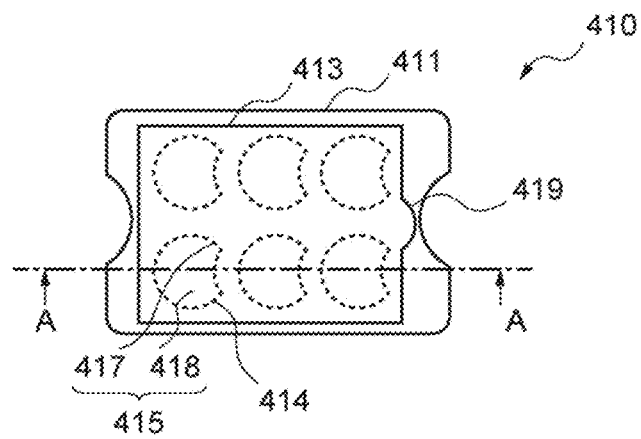
FIGS. 30(a) to 30(c) are diagrams provided to explain conventional cosmetic containers.
Figure 30B:
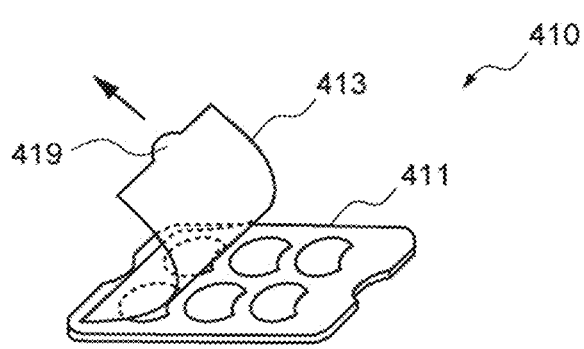
Figure 30C:
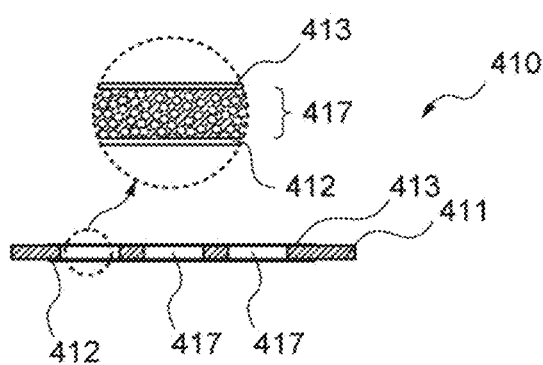
Figure 31:
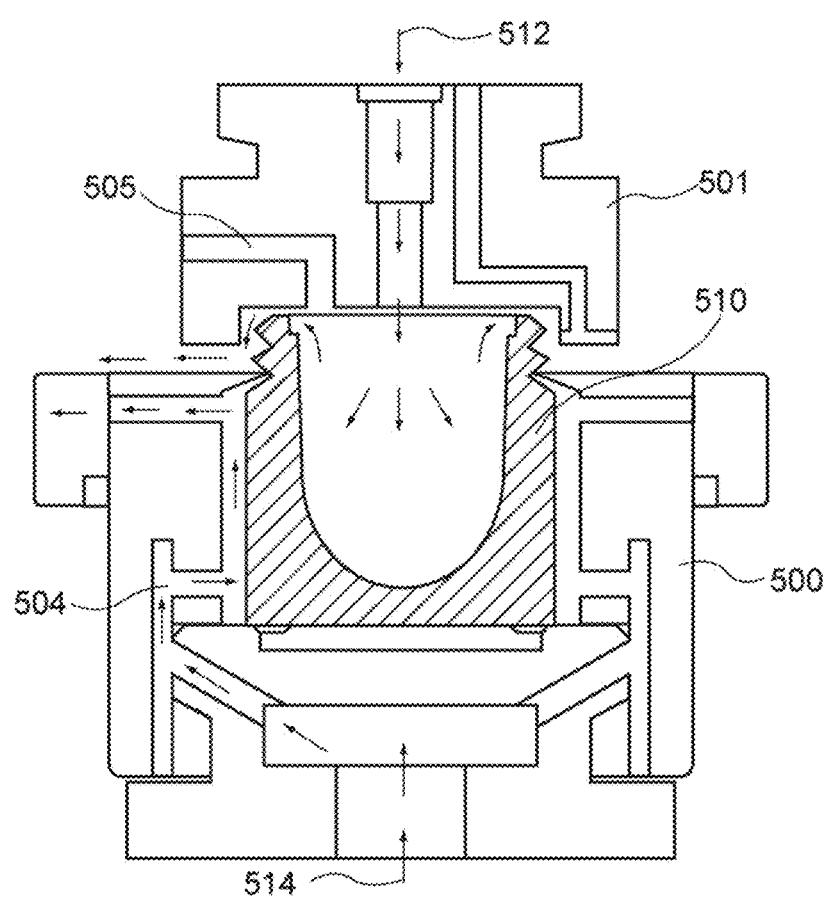
FIG. 31 is a diagram provided to explain a conventional one-press bottle making method.

In the guide ring 30 for the molding mold 100 used in Comparative Example 4, as illustrated in FIGS. 29(a) and 29(b), the opening is split into two by the partition section 32a, and the two convex surfaces in the molding surface section 52 of the plunger 50 move upward and downward through those two openings.

The end surface of the mouth in the glass container is molded by the end surface molding unit 34b at the upper surface of the guide ring 30, and the end surface of the partition section in the glass container is molded by the end surface molding unit 34a at the top plane of the partition section 32a.

Therefore, since the end surface of the mouth and the end surface of the partition section in the glass container are respectively molded at the same height, a "rim" does not exist.

Furthermore, since the partition section 32a at the upper surface of the guide ring 30 is interposed at the concave portions between convex surfaces, which is a site in the plunger 50 where temperature is particularly easily elevated, it is highly likely that the temperature rises noticeably.

Therefore, in a case in which a guide ring 30 having a partition section 32a as illustrated in FIGS. 29(a) and 29(b) is used, distortion occurs noticeably in the partition section of the glass container thus obtainable, and this distortion in the partition section is likely to be directly transmitted to the entirety of the mouth.

As a result, it was confirmed that, as it became more difficult to screw-fit a lid, dimensional stability was deteriorated.

FIG. 28 is a cross-sectional view in the case in which the entirety including the molding mold 100, the plunger 50 and the like was cut at a plane that orthogonally intersected a bisecting cross-section for splitting the molding mold 100 into two and opening the molding mold 100, and the cut surface is viewed from the front face. FIG. 29(a) is a plan view of the guide ring 30, and FIG. 29(b) is a cross-sectional view of the guide ring 30.

TABLE 1

| | Production conditions | | Glass container | | | | | | | | | | |
|---|---|---|---|---|---|---|---|---|---|---|---|---|---|
| | Step (A) | Step (C) | Rim | | | Concavities | | | | | | Evaluation | |
| | | | | | | | Thickness | | | | | | |
| | Temperature of gob $T_G$ (° C.) | Temperature of plunger $T_P$ (° C.) | Width L1 (mm) | Height L2 (mm) | Area A of inner side of rim (mm$^2$) | Unit number (units) | L3 of thinnest portion of partition section (mm) | Depth L4 (mm) | Total opening area B (mm$^2$) | Proportion of B to A (%) | Maximum diameter L5 of mouth (mm) | Maximum diameter L6 of body (mm) | Evaluation of distortion in partition section | Evaluation of defects in rim/partition section |
| Example 1 | 1095 | 350 | 3.05 | 4.5 | 1134 | 3 | 4.50 | 15.5 | 815 | 72 | 44.20 | 54.60 | Very good | Very good |
| Example 2 | 1120 | 325 | 2.52 | 4.0 | 309 | 2 | 2.50 | 12.9 | 262 | 85 | 24.94 | 35.69 | Good | Very good |
| Example 3 | 1095 | 323 | 2.85 | 3.8 | 706 | 2 | 4.50 | 8.8 | 579 | 82 | 35.80 | 45.00 | Very good | Very good |
| Example 4 | 1100 | 330 | 3.05 | 3.5 | 638 | 2 | 4.50 | 9.5 | 517 | 81 | 34.60 | 40.49 | Very good | Very good |
| Example 5 | 1100 | 293 | 3.80 | 10.5 | 1885 | 4 | 3.56 | 8.0 | 1016 | 54 | 56.60 | 67.00 | Very good | Very good |
| Comparative Example 1 | 1085 | 535 | 3.05 | 4.5 | 1134 | 3 | 4.50 | 15.5 | 815 | 72 | 44.20 | 54.60 | Bad | Bad |
| Comparative Example 2 | 1095 | 385 | 2.85 | 3.8 | 706 | 2 | 4.50 | 8.8 | 579 | 82 | 35.80 | 45.00 | Bad | Good |
| Comparative Example 3 | 1070 | 380 | 3.80 | 10.5 | 1885 | 4 | 3.56 | 8.0 | 1016 | 54 | 56.60 | 67.00 | Bad | Bad |
| Comparative Example 4 | 1095 | 350 | — | — | *1885 | 2 | 6.00 | 33.8 | 1541 | *82 | 56.00 | 65.00 | Bad | Fair |

*In the glass container of Comparative Example 4, a "rim" does not exist; however, for the convenience of comparison, the portion in the mouth excluding the partition section is regarded as the rim, and the values are described.

INDUSTRIAL APPLICABILITY

As discussed above, according to the method for producing a glass container of the invention, when the temperature of the gob and the temperature of the plunger are respectively regulated to predetermined ranges in a one-press process, even in a case in which multiple concavities are formed at the bottom plane of a mouth provided with a rim, the occurrence of distortion or defects can be effectively suppressed.

As a result, even in a case in which a solid cosmetic material obtained by consolidating a powdered cosmetic material such as a powder foundation or a face powder is accommodated therein, the powder is not easily scattered outside the container, and a glass container having superior aesthetic appearance can be produced with high yield.

Therefore, it is highly expected that the glass container of the invention and the one-press method for producing the glass container can contribute particularly to the enhancement of practical usability and designability of cosmetic containers.

REFERENCE NUMERALS

10: MOLDING MOLD BASE,
12: BODY MOLDING UNIT,
20: NECK RING MOLD,
22: MOUTH MOLDING UNIT,
22a: MOUTH,
26: GUIDE RING ACCOMMODATING UNIT, 28: SPRING MEMBER,
30: GUIDE RING,
32: UPPER SURFACE,
36: PEDESTAL ACCOMMODATING UNIT, 38: PROJECTION SECTION,
50: PLUNGER,
52: MOLDING SURFACE SECTION,
54: PEDESTAL SECTION,
56a: COOLING AIR SUPPLY INLET,
56b: COOLING AIR SUPPLY OUTLET,
56c: COOLING AIR DISCHARGE PORT,
56: INTERNAL COOLING DEVICE,
60: BAFFLE,
61: CONVEXITY,
70: GOB,
72: FUNNEL,
80: COOLING MOLD,
82: BOTTOM MOLD,
82a: BLOWING HOLE,
82b: SECOND SUPPLY OUTLET,
84: FINISHING MOLD,
86: BLOW HEAD,
86a: BLOWING HOLE,
86b: FIRST SUPPLY OUTLET,
96: FIRST COOLING AIR FLOW,
98: SECOND COOLING AIR FLOW,
100: MOLDING MOLD,
200: GLASS CONTAINER,
200': GLASS CONTAINER HAVING FINISHED SHAPE,
202: MOUTH,
202a: RIM,
202b: BOTTOM PLANE,
202c: MULTIPLE CONCAVITIES,
202d: PARTITION SECTION,
206: BODY,
300: INDIVIDUAL SECTION MACHINE (IS MACHINE)

The invention claimed is:

1. A glass container comprising:
a glass body having a lateral portion defined by a wall, a lower portion defined by a bottom having an inner surface and substantially flat outer surface, and an upper portion defined by a mouth, said mouth having a rim and said wall having a maximum outer diameter that is equal to or greater than a maximum outer diameter of the mouth;
a first glass partition integral with the glass body, extending from the inner surface of the bottom into the mouth and terminating below the rim, the first glass partition also extending from a first proximal point on the wall to a first distal point on the wall;
a second glass partition integral with the glass body, extending from the inner surface of the bottom into the mouth and terminating below the rim, the second glass partition also extending from a second proximal point on the wall to a second distal point on the wall;
a first concave compartment defined by a first portion of the wall, a first portion of the first glass partition, and a first portion of the inner surface of the bottom;
a second concave compartment defined by a second portion of the wall, a first portion of the second glass partition, and a second portion of the inner surface of the bottom; and
a third concave compartment located between the first concave compartment and second concave compartment, the third concave compartment defined by third and fourth portions of the wall, a second portion of the first glass partition, a second portion of the second glass partition, and a third portion of the inner surface of the bottom; wherein
a first part defined between the first portion of the first glass partition and the second portion of the first glass partition is solid glass,
a second part defined between the first portion of the second glass partition and the second portion of the second glass partition is solid glass, and
where the area between the inner surface of the bottom and substantially flat outer surface of the bottom is solid glass.

2. The glass container according to claim 1, wherein the rim has a thickness of from 2 to 4 mm.

3. The glass container according to claim 1, where the first and second glass partitions terminate at a distance of 2 to 12.5 mm below the rim.

4. The glass container according to claim 1, where the thickness of a thinnest portion of the first and/or second glass partition is 2 to 4.5 mm.

5. The glass container according to claim 1, where said concave compartments have a depth, as defined by a height of the partitions, of 7.5 to 16 mm.

6. The glass container according to claim 1, wherein the concave compartments each define lower portions, and wherein the lower portions of the concave compartments define a total surface area, taken along a plane parallel to the bottom of the container, of from 50 to 93% of the total surface area of the bottom of the container.

7. The glass container according to claim 1, where the wall has a maximum inner diameter that is greater than the maximum inner diameter of the mouth.

8. The glass container of claim 1, where the container is prepared by a process including:
(A) fitting a funnel into a mold, and then introducing a gob at 1090° C. to 1150° C. into the mold through the funnel;
(B) detaching the funnel from the mold, and then fitting a baffle into the mold;
(C) regulating the temperature of a molding surface section in a plunger having multiple convex surfaces on its molding surface section, to a value within the range of 270° C. to 370° C., subsequently inserting the plunger into the mold from a side opposite to the side where the baffle is fitted, subsequently pressing the gob, and thereby molding a glass container having a finished shape from the gob;
(D) pulling out the plunger from the glass container having a finished shape; and
(E) transferring the glass container having a finished shape into a cooling mold and cooling the glass container.

9. The container of claim 8, wherein the difference obtained by subtracting the temperature of the molding surface section in Step (C) from the temperature of the gob in Step (A) is 740° C. to 810° C.

10. The container of claim 8, wherein in Step (C), the glass container having a finished shape is cooled by blowing cooling air to the inner peripheral surface of the molding surface section.

11. The container of claim 8, wherein in Step (C), the glass container having a finished shape is cooled by blowing cooling air to the outer peripheral surface of the molding surface section.

* * * * *